United States Patent [19]
Iwamoto et al.

[11] Patent Number: 5,974,225
[45] Date of Patent: Oct. 26, 1999

[54] VIDEO DATA RECORDING AND REPRODUCING APPARATUS AND METHOD THEREOF

[75] Inventors: Tetsuya Iwamoto; Akira Sugiyama; Hiroshi Inamura, all of Kanagawa; Atsumu Soda; Junichi Ogikubo, both of Tokyo, all of Japan

[73] Assignee: Sony Corporation, Tokyo, Japan

[21] Appl. No.: 09/109,773

[22] Filed: Jul. 2, 1998

Related U.S. Application Data

[63] Continuation of application No. 08/659,755, Jun. 6, 1996, Pat. No. 5,857,058.

[30] Foreign Application Priority Data

| Jun. 8, 1995 | [JP] | Japan | 7-142239 |
| Jun. 8, 1995 | [JP] | Japan | 7-142240 |
| Jun. 8, 1995 | [JP] | Japan | 7-142241 |

[51] Int. Cl.⁶ ............................. H04N 5/917; H04N 7/26
[52] U.S. Cl. ............................. 386/109; 386/112
[58] Field of Search ............................. 386/109, 111, 386/112, 124, 27, 33, 46, 68, 40, 1, 6; 360/32; H04N 5/917, 7/26

[56] References Cited

U.S. PATENT DOCUMENTS

| 4,862,295 | 8/1989 | Tanaka et al. | 360/48 |
| 5,282,049 | 1/1994 | Hatakenaka et al. | 386/109 |
| 5,377,051 | 12/1994 | Lane et al. | 360/33.1 |

*Primary Examiner*—Robert Chevalier
*Attorney, Agent, or Firm*—Frommer Lawrence & Haug, LLP.; William S. Frommer

[57] ABSTRACT

A video data recording apparatus which divides video data which has been compressed and encoded in units of groups of pictures (GOPs) comprised of the video data of a predetermined plurality of frames into a plurality of data blocks of a predetermined format, adding a GOP identifying code for identifying a GOP of compressed and encoded video data, recording on a predetermined number of slanted tracks on the tape the plurality of data blocks. Also, a video data reproduction apparatus which reproduces the video data recorded by the video data recording apparatus by simple tracking control.

18 Claims, 17 Drawing Sheets

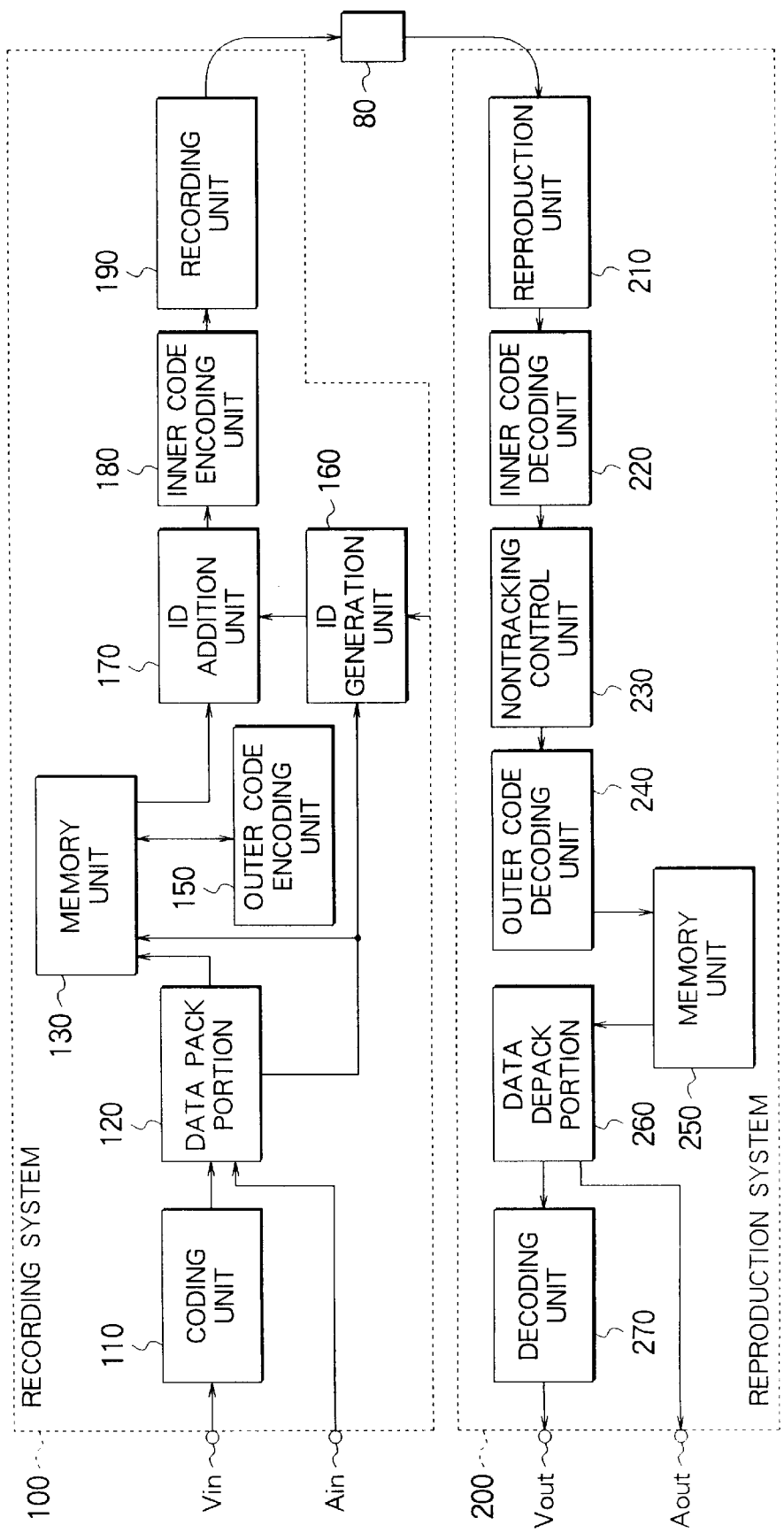

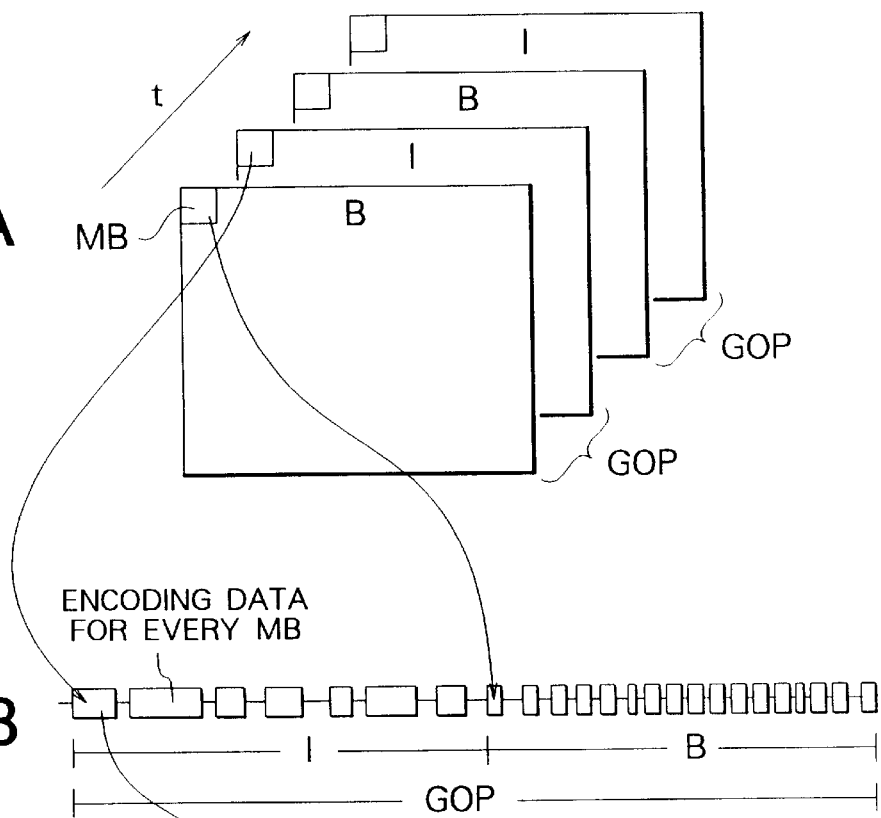
FIG. 2A
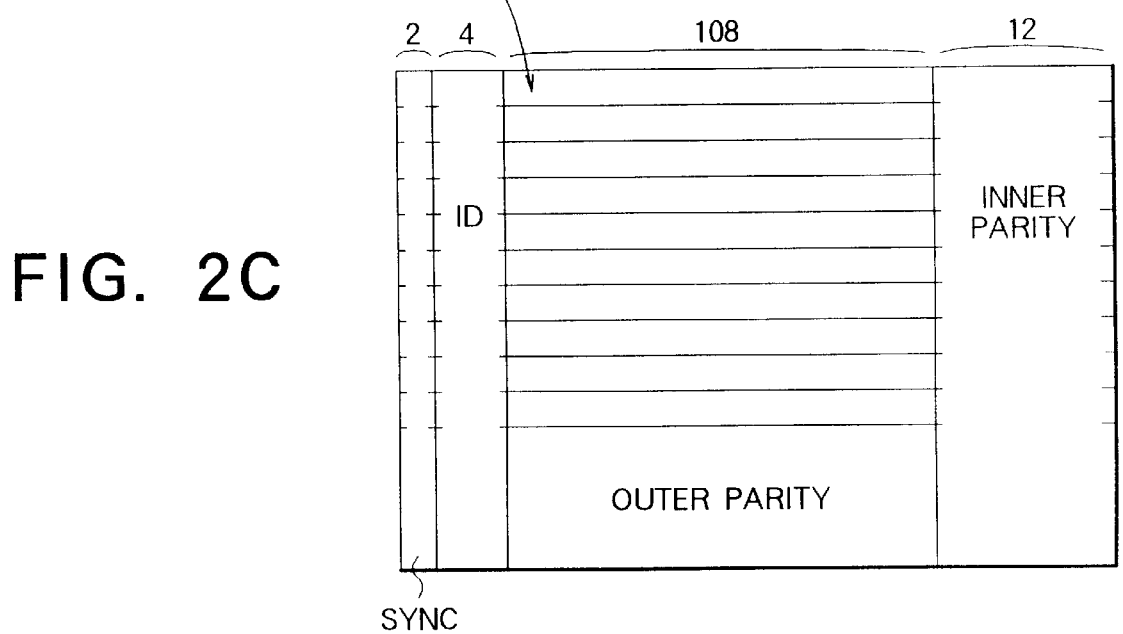
FIG. 2B
FIG. 2C

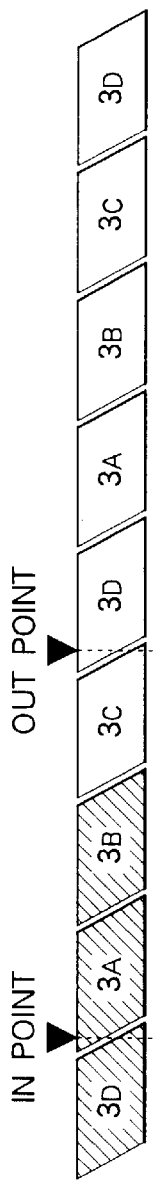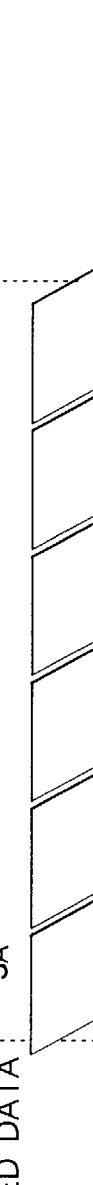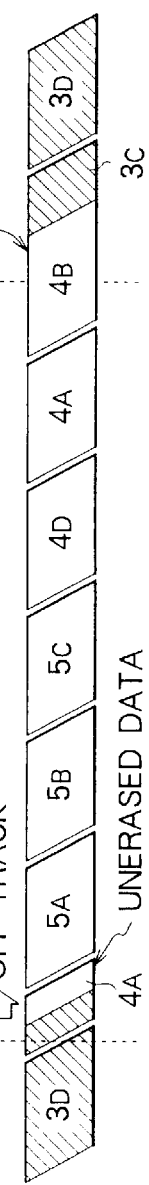
FIG. 15A
FIG. 15B
FIG. 15C
FIG. 15D
FIG. 15E
FIG. 15F

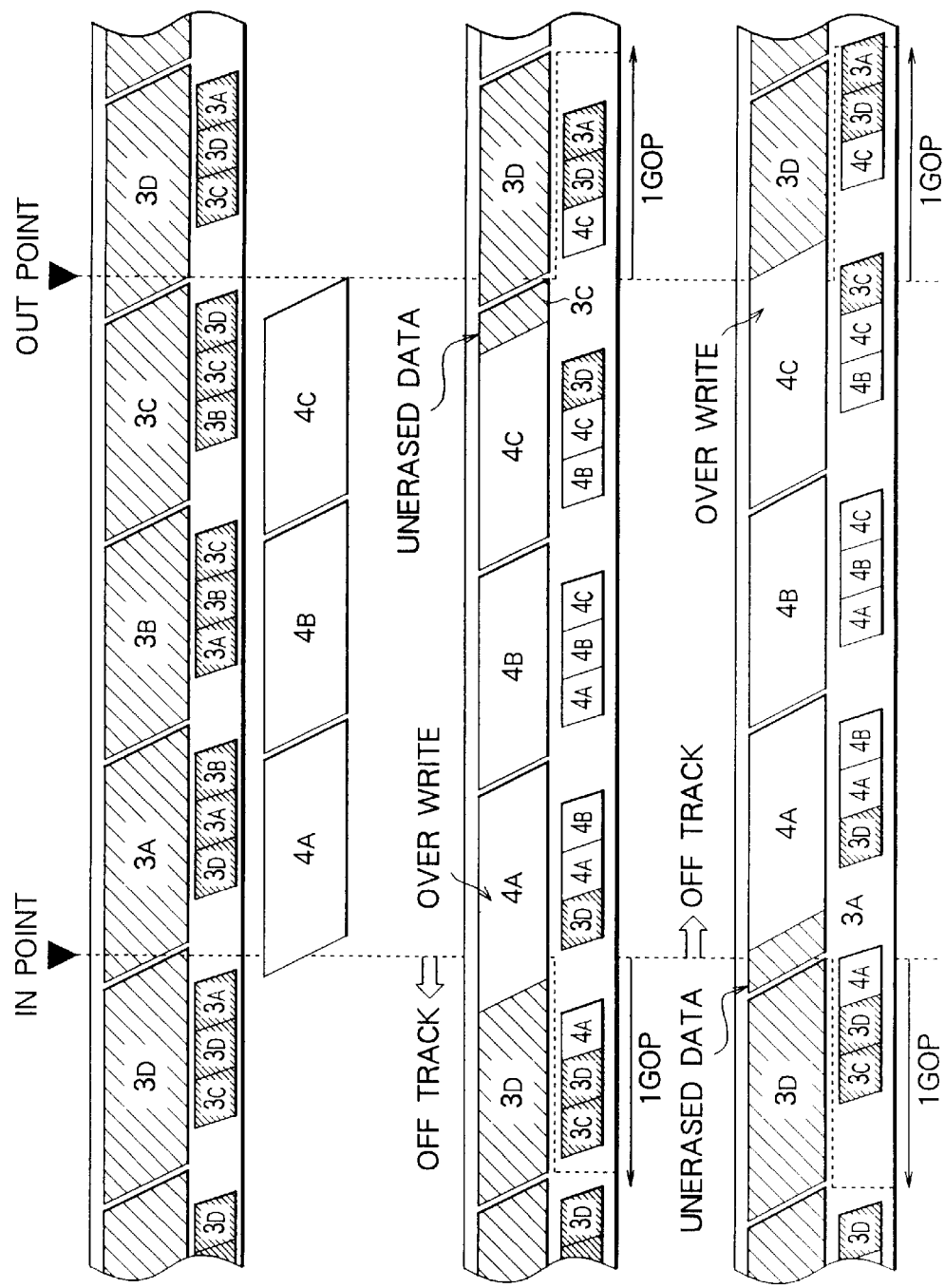

VIDEO DATA RECORDING AND REPRODUCING APPARATUS AND METHOD THEREOF

This Application is a continuation of prior application Ser. No. 08/659,755 filed Jun. 6, 1996, now patented (U.S. Pat. No. 5,857,058).

1. FIELD OF THE INVENTION

The present invention relates to a video data recording apparatus and a method thereof which records video data compressed and encoded in units of groups-of-pictures (GOP) on a recording medium so that nontracking reproduction is possible and a video data reproducing apparatus and a method thereof which reproduces data from the recording medium.

2. DESCRIPTION OF THE RELATED ART

In a video tape recorder (VTR) and video cassette recorder (VCR), which record and reproduce video signals, a control signal recorded on a side of the tape is reproduced together with the recorded video signal, the rotation of the rotary head and capstan is controlled by this control signal, and tracking servo control is applied so that the path of scanning of the rotary head at the time of reproduction and the recording track on the tape coincide with each other.

Also, recently, track widths have been made smaller to enable high density recording, so a higher precision of tracking control becomes necessary. For this reason, there is known a VTR device adopting a configuration in which for example the rotary head can be moved by a piezoelectric element and the rotary head is moved by the change of the envelope of the generated signal obtained by causing the rotary head to wobble etc. and thereby enable correct tracking.

As a prerequisite for performing such high precision tracking, there is provided an apparatus in which the mechanical precision and strength of the tape travelling path including the tape guide drum are higher in degree and there is provided a tape recording medium to which various limitations are added and which has a high quality.

On the other hand, developments of image coding technology in recent years have resulted in the spread of a method of recording video data by defining a plurality of frames worth of the video data as a group-of-pictures (hereinafter referred to as a GOP) and carrying out inter-frame encoding in units of this GOP. In video data which is encoded over a plurality of frames in this way, however, when data is lost or misplaced at the time of reproduction, an adverse influence is exerted upon a plurality of frames of the video data. For this reason, correct reproduction of data becomes necessary and higher precision tracking control becomes necessary also on this point.

High precision tracking servo control, however, suffers from the disadvantage in that a high class head having a very high precision, a control circuit which is complex and has a little error, etc. are required and therefore reduction in cost of the apparatus is difficult. Particularly, there has been a demand that it be possible to suitably record and reproduce data by a simpler tracking control, by an apparatus having a mechanism of a usual precision, and by using a tape recording medium of a relatively low quality even with respect to video data encoded for every GOP.

SUMMARY OF THE INVENTION

An object of the present invention is to provide a video data recording apparatus and a video data recording method which store video data on tape compressed and encoded by a GOP unit and enable a reproduction of the video data by a simple tracking control.

Another object of the present invention is to provide a video data reproduction apparatus and video data reproduction method which enable a reproduction of video data compressed, encoded and recorded on a recording tape by a GOP unit, by a simple tracking control.

Still another object of the present invention is to provide a video data recording and reproduction apparatus and a video data recording and reproduction method, which store video data compressed-encoded by a GOP unit on a recording tape, and enable a reproduction of the video data recorded on the recording tape by the simple tracking control.

According to the present invention, to achieve the above object, there is a video data recording apparatus for recording video data on a slanted track on a tape, comprising: a compressing and encoding means for compressing and encoding a video signal in units of groups of pictures (GOPs) including the video data of a predetermined plurality of frames; a data arranging means for dividing the video data compressed and encoded by the compressing and encoding means into a plurality of data blocks of a predetermined format; a generating means for generating a GOP identifying code for identifying a GOP of video data compressed and encoded by the compressing and encoding means; an adding means for adding a GOP identifying code generated by the generating means to each of the data blocks; and a recording means for recording on a predetermined number of slanted tracks on the tape the plurality of data blocks to each of which a GOP identifying code has been added by the adding means.

According to the present invention, to achieve the above another object, there is also a video data reproduction apparatus for reproducing video data from a tape on which video data which has been compressed and encoded in units of groups of pictures (GOPs) including a predetermined number of a plurality of frames of video data has been divided into a plurality of data blocks of a predetermined format, added at each data block with a GOP identifying code for identifying the GOP of the compressed and encoded data, and recorded on a predetermined number of slanted tracks on the tape. The apparatus comprises: a reproducing means for scanning the slanted tracks of the tape and reproducing said data blocks from the slanted tracks; a detecting means for detecting said GOP identifying codes which have been added to said data blocks reproduced by the reproducing means; a classifying means for classifying the data blocks reproduced by the reproducing means based on the GOP identifying codes detected by the detecting means, and a selecting means for outputting the data blocks classified by the classifying means as reproduced video data in units of the GOPs.

According to the present invention, to achieve still another object, there is further provided a video data recording and reproducing apparatus for recording video data on a slanted track on a tape and reproducing the video data from the tape, comprising: a compressing and encoding means for compressing and encoding said video signal in units of groups of pictures (GOPS) including the video data of a predetermined plurality of frames; a data arranging means for dividing the video data compressed and encoded by the compressing and encoding means into a plurality of data blocks of a predetermined format; a generating means for generating a GOP identifying code for identifying a GOP of video data compressed and encoded by said compressing and encoding means; an adding means for adding a GOP identifying code generated by the generating means to each of the data blocks; a recording means for recording on a predetermined number of slanted tracks on the tape the plurality of data blocks to each of which a GOP identifying code has been added by the adding means; a reproducing means for scanning the slanted tracks of the tape and reproducing the data blocks from the slanted tracks; a detecting means for detecting the GOP identifying codes which have been added to the data blocks reproduced by the reproducing means; a classifying means for classifying said data blocks reproduced by the reproducing means based on the GOP identifying codes detected by the detecting means; and a selecting means for outputting the data blocks classified by the classifying means as reproduced video data in units of the GOPs.

BRIEF DESCRIPTION OF THE DRAWINGS

The above and other objects and features of the present invention will be described in detail with reference to the accompanying drawings, in which:

FIG. 1 is a block diagram of an embodiment of a video data recording and reproducing apparatus of the present invention;

FIGS. 2A to 2C are views explaining the operation of the video data recording and reproducing apparatus shown in FIG. 1;

FIGS. 15A to 15F are views of the recording operation of the video data recording and reproduction apparatus shown in FIG. 11;

FIGS. 16A to 16D are views explaining the recording operation of the video data recording and reproduction apparatus shown in FIG. 11.

DETAILED DESCRIPTION OF THE PREFERRED EMBODIMENTS

Figure 3A:
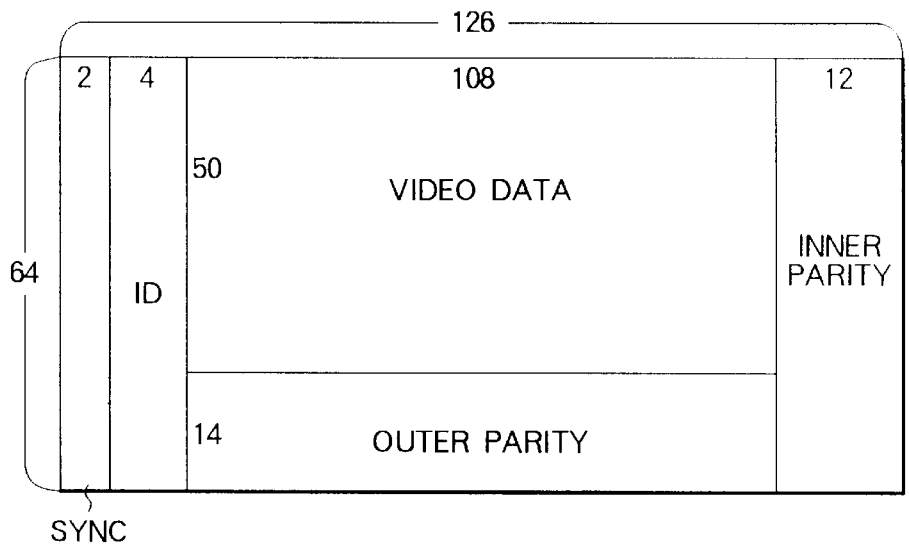
FIGS. 3A to 3D are views of formats of a data recorded on a tape by the video data recording and reproduction apparatus shown in FIG. 1.

As a preferred embodiment of the present invention, a video data recording and reproducing apparatus of the present invention will be explained.

The video data recording and reproducing apparatus of the present embodiment is a video cassette recorder having a recording unit which records the input video data on a cassette type tape medium so that nontracking reproduction is possible and a reproduction unit which performs the nontracking reproduction for the video data recorded on that tape medium.

Note, the video data recording and reproducing apparatus of the present invention can be applied either as a video data recording apparatus, a video data reproducing apparatus or a video data recording and reproducing apparatus having both constructions and features of the video data recording apparatus and the video data reproducing apparatus. Also note, the video data recording and reproducing apparatus of the present invention can be divided into a data recording apparatus and a video data reproducing apparatus.

In the following description, the video data recording and reproducing apparatus will be described as a video data recording apparatus of the present invention and as a a a video data reproducing apparatus.

In the following description, typically, the construction and data processing for video data (or image data) will be described, naturally, the video data recording and reproducing apparatus of the present invention has the construction and performs a data processing of audio data which are usually, related to the video data to be processed.

First Embodiment

First, an explanation will be made of the configuration of the video data recording and reproducing apparatus of a first embodiment.

FIG. 1 is a block diagram of the main constituent portions involved in the flow of the data of the video data recording and reproducing apparatus of the present embodiment.

A video data recording and reproducing apparatus 10 shown in FIG. 1 has a recording system 100 for recording data to a video cassette tape 80, and a reproduction system 200 for reproducing the data from the video cassette tape 80.

First, an explanation will be made of the configuration of the recording system 100.

The recording system 100 has an encoding unit 110, a data pack portion 120, a memory unit 130, an outer code encoding unit 150, an identification (ID) generation unit 160, an ID addition unit 170, an inner code encoding unit 180, and a recording unit 190.

The recording system 100 records the video and audio data input from a video input terminal Vin and the audio data input from an audio input terminal Ain, on the video cassette tape 80 in a format which can be reproduced by a reproducing apparatus such as the reproduction system 200 of this video data recording and reproducing apparatus 10.

The encoding unit 110 compresses the video signal input from the video input terminal Vin, encodes the same, and outputs the result as the video bit stream to the data pack portion 120. This compression and coding can be achieved by performing orthogonal transformation encoding such as a discrete cosine transform (DCT) encoding and predictive encoding similar to the encoding method of a moving picture experts group (MPEG) method or the like, performing quantization and variable length encoding, and generating an encoded data train. A concrete explanation will be made next of the operation of the encoding unit 110 referring to FIGS. 2A to 2C.

The encoding unit 110 performs the encoding of a series of images as shown in FIG. 2A while alternately defining an intra coded picture (an I-picture) and a bidirectionally predictive coded picture (B-picture) for every frame. Namely, inter-frame encoding is carried out for every other frame. Each frame during this time is subjected to bidirectional predictive coding from the I-picture before or after this. Also, each picture is encoded in units of macro blocks consisting of 16 pixels×16 lines. As a result, as shown in FIG. 2B, the encoded data for every macro block of I-picture encoded preceding the B-picture and the encoded data for every macro block of B-picture are sequentially generated. These two frames are defined as one group of picture (GOP) and the data for every GOP are output to the data pack portion 120. In FIGS. 2A and 2B, a symbol I indicates an I-picture and a symbol B indicates a B-picture.

The data pack portion 120 sequentially arranges the video encoded data for every GOP input from the encoding unit 110 and audio data input from the audio input terminal Ain in the predetermined data regions of data blocks of a predetermined format. An explanation will next be made of a data block by referring to FIGS. 3A to 3C.

Figure 3B:
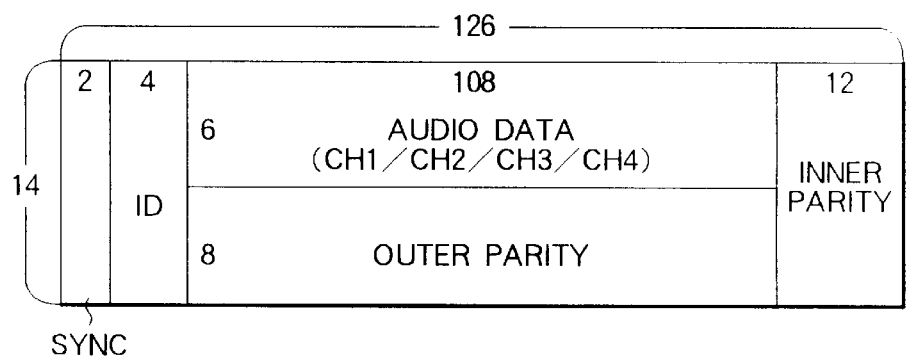
Figure 3C:
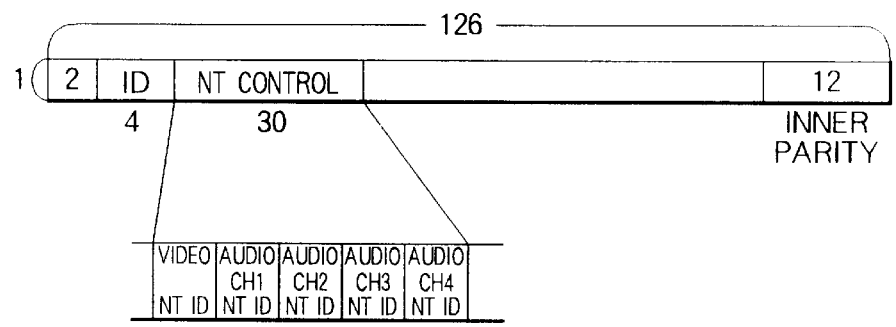

FIGS. 3A to 3C are views of the format of a data block which is used as the unit of the data to be recorded on the video cassette tape 80, in which FIG. 3A is a view of the format of the video data; FIG. 3B is a view of the format of the audio data; and FIG. 3C is a view of the format of system ancillary (auxiliary) data.

As shown in FIG. 3A, the video data for one GOP is comprised of a unit of a data block consisting of 126 bytes of data comprised of 2 bytes of a synchronization signal (SYNC), 4 bytes of a data identification code (ID), 108 bytes of data, and 12 bytes of inner parity.

One ECC (error correction code) block is constituted by a predetermined number (50 in FIG. 3A) of data blocks in which the video data are recorded as data and a predetermined number of data blocks (14 in FIG. 3A) in which the outer parity with respect to that video data are recorded as the data. One GOP's worth of video data is comprised by 36 ECC blocks of data having 625 scanning lines and 50 fields or by 30 ECC blocks in data having 525 scanning lines and 60 fields.

Also the audio data is comprised of units of data blocks similar to those of the video data as shown in FIG. 3B. One ECC block is constituted by a predetermined number (6 in FIG. 3B) of data blocks in which the audio data are recorded as the data and a predetermined number of data blocks (8 in FIG. 3B) in which the outer parity with respect to that audio data are recorded as the data. One GOP's worth of audio data is comprised by 12 ECC blocks of data having 625 scanning lines and 50 fields or by 10 ECC blocks of data having 525 scanning lines and 60 fields.

Note that, in the video data recording and reproducing apparatus 10 of the present embodiment, four channels of audio data are recorded. The audio data shown in FIG. 3B is comprised for every audio data of each channel.

Also, system ancillary data as shown in FIG. 3C is generated for for every GOP. As this system ancillary data, the ID data for the nontracking control mentioned later and the management data for every frame constituting the GOP, etc. are stored.

The data pack portion 120 suitably arranges the data for every macro block, that is, the data of each picture, and the audio data in the data recording regions of the data blocks of the format shown in FIG. 2C. It can be said that this processing is performed for data of a fixed length by arranging the respective data subjected to the variable length encoding in data blocks of a predetermined format and enables recording on the video cassette tape 80. Also, the data pack portion 120 generates the data blocks of the system ancillary data. Then, the data block of the video data generated in the data pack portion 120, the data block of the audio data, and the data block of the system ancillary data are recorded in the memory unit 130, respectively.

Also, the signal indicating the punctuation for every GOP is output from the data pack portion 120 to the memory unit 130 and the ID generation unit 160.

The memory unit 130 is a storage means for storing the video data, audio data, and system ancillary data for every GOP which are sequentially input from the data pack portion 120 in units of GOP and is constituted by a memory and a control unit controlling the input and output of the data to and from the memory. The outer parity is added to the data for every GOP stored in this memory unit 130 by the outer code encoding unit 150. Also, the data added with the outer parity are sequentially output to the ID addition unit 170 for recording to the video cassette tape 80.

Note that, the control unit of the memory unit 130 receives as input a signal indicating the punctuation of the GOP from the data pack portion 120, and the processing for every GOP is sequentially carried out based on this signal. Also, respective processings of the input of the data from the data pack portion 120, the input and output of the data to and from the outer code encoding unit 150 and the output of the data to the ID addition unit 170 are controlled by the control unit of the memory unit 130 and simultaneously carried out.

The outer code encoding unit 150 imparts an outer parity to the video data and audio data for every GOP stored in the memory unit 130. The outer code encoding unit 150 accesses the respective data stored in the memory via the control unit of the memory unit 130, generates the outer parity, and arranges the same in the data recording regions of the data blocks for the outer parity as shown in FIG. 2C and FIGS. 3A and 3B. Also the data blocks for this generated outer parity are stored in the memory unit 130 together with the video data and audio data.

The ID generation unit 160 generates an identification code (ID) for every GOP based on the signal indicating the punctuation of the GOP input from the data pack portion 120 and outputs the same to the ID addition unit 170. The ID for every GOP is respectively independently generated for each of the video data and 1 to 4 channels of audio data.

To the ID generation unit 160, at the head of one series of video data etc., a signal determining the initial value of the ID is appropriately input from the control unit of the illustrated video data recording and reproducing apparatus 10. The ID is determined according to this when this signal is input. Also, when the signal is not input, the ID is updated by a predetermined rule based on the signal indicating the punctuation of the GOP input from the data pack portion 120. In the present embodiment, the ID is sequentially counted up.

The ID addition unit 170 sequentially reads the data for every GOP given the outer parity from the memory unit 130 and sets the identification code of GOP input from the ID generation unit 160 for every data block. The ID addition unit 170 sets the ID in the identification code storage region existing at the head of each data block for the video data and audio data read out from the memory unit 130. Also, for the system ancillary data, the ID is set in the identification code storage region thereof and, at the same time, as shown in FIG. 3C, further, each identification code given to the video data and audio data is set as the data for performing the nontracking control at a predetermined position of that data storage region.

The inner code encoding unit 180 imparts an inner parity with respect to the video data, audio data, and the system ancillary data for every GOP input from the ID addition unit 170. The inner code encoding unit 180 arranges the inner parity with respect to the data block at the position of the last 12 bytes of the data block of each data as shown in FIG. 2C and FIGS. 3A to 3C. Each data block in which the parity is arranged is output to the recording unit 190.

The recording unit 190 actually records the video data, audio data, and system ancillary data for each of the GOPs which are sequentially input on the video cassette tape 80.

An explanation will be made next of the recording format of that video cassette tape 80 referring to FIG. 4 and FIG. 5.

Figure 4:
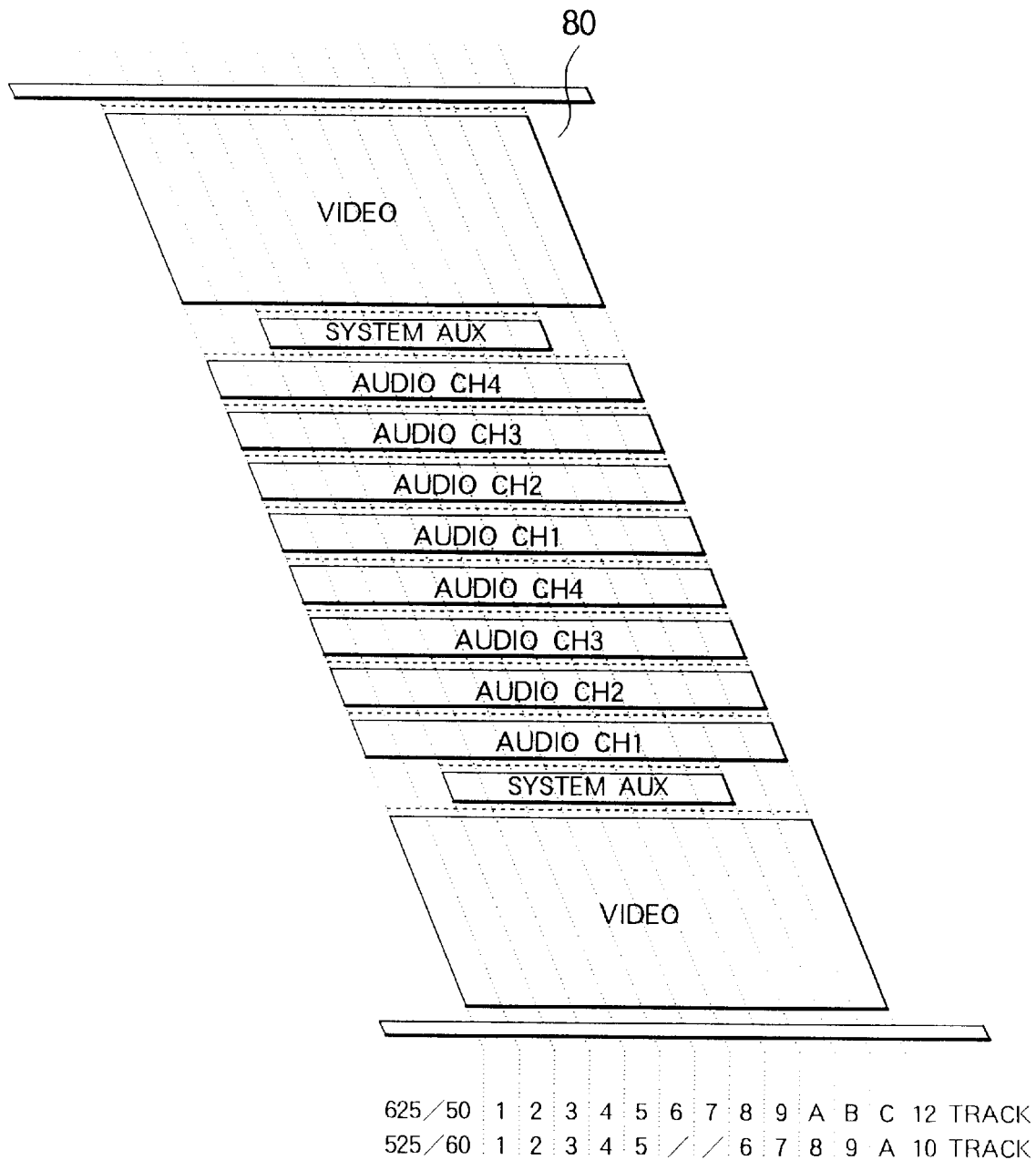
FIG. 4 is a view of the recording format of one GOP's worth of video data, audio data and auxiliary data recorded on the tape by the video data recording and reproduction apparatus shown in FIG. 1.

FIG. 4 is a view of the recording format of one GOP's worth of video data;

In FIG. 4, one GOP's worth of data are recorded on 10 or 12 tracks. The number of the tracks is 12 if the data has 625 scanning lines and 50 fields and 10 if the data has 525 scanning lines and 60 fields.

Each track has a video data region VIDEO in which the video signal is recorded, an audio data region AUDIO in which the audio signal is recorded, and a system ancillary data region SYSTEM AUX in which the system ancillary signal is recorded. In the present embodiment, it has 4 channels of audio signals as the audio signal as mentioned before and each signal is recorded while divided into two regions as illustrated.

In this embodiment, the system ancillary data are not recorded on two preceding and subsequent tracks contacting tracks of GOP data.

In this way, 12 or 10 tracks are assigned to the data for every GOP and further the video data for every GOP are sequentially recorded in the longitudinal direction of the video cassette tape 80 so as to record video data.

Figure 5:
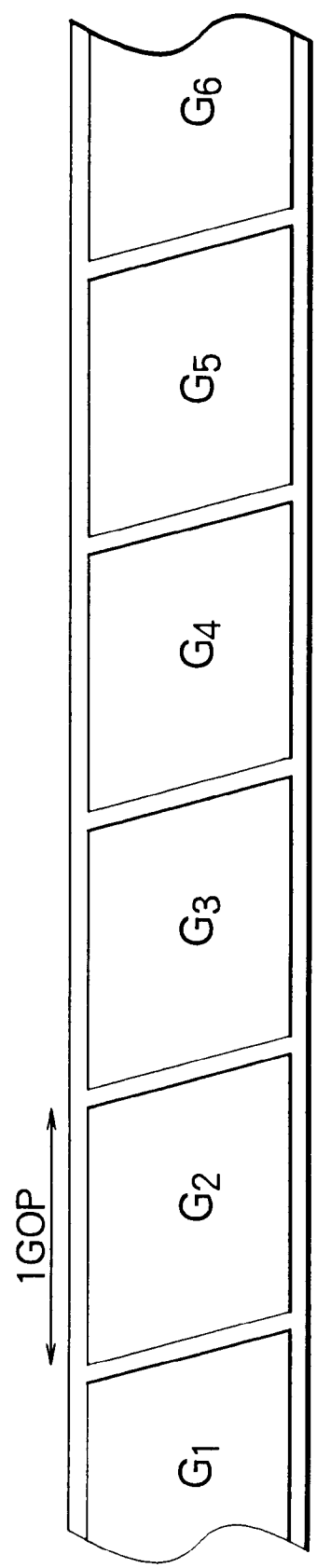
FIG. 5 is a view showing an arrangement of a plurality of GOPs recorded on the tape by the video data recording and reproduction apparatus shown in FIG. 1.

The state of the recording is shown in FIG. 5. FIG. 5 is a view showing a state where the data of the GOPs G1 to G6 are sequentially recorded.

Next, an explanation will be made of the configuration of the reproduction system 200.

In FIG. 1, the reproduction system 200 has a reproduction unit 210, an inner code decoding unit 220, a nontracking control unit 230, an outer code decoding unit 240, a memory unit 250, a data depack portion 260, and a decoding unit 270.

Figure 6:
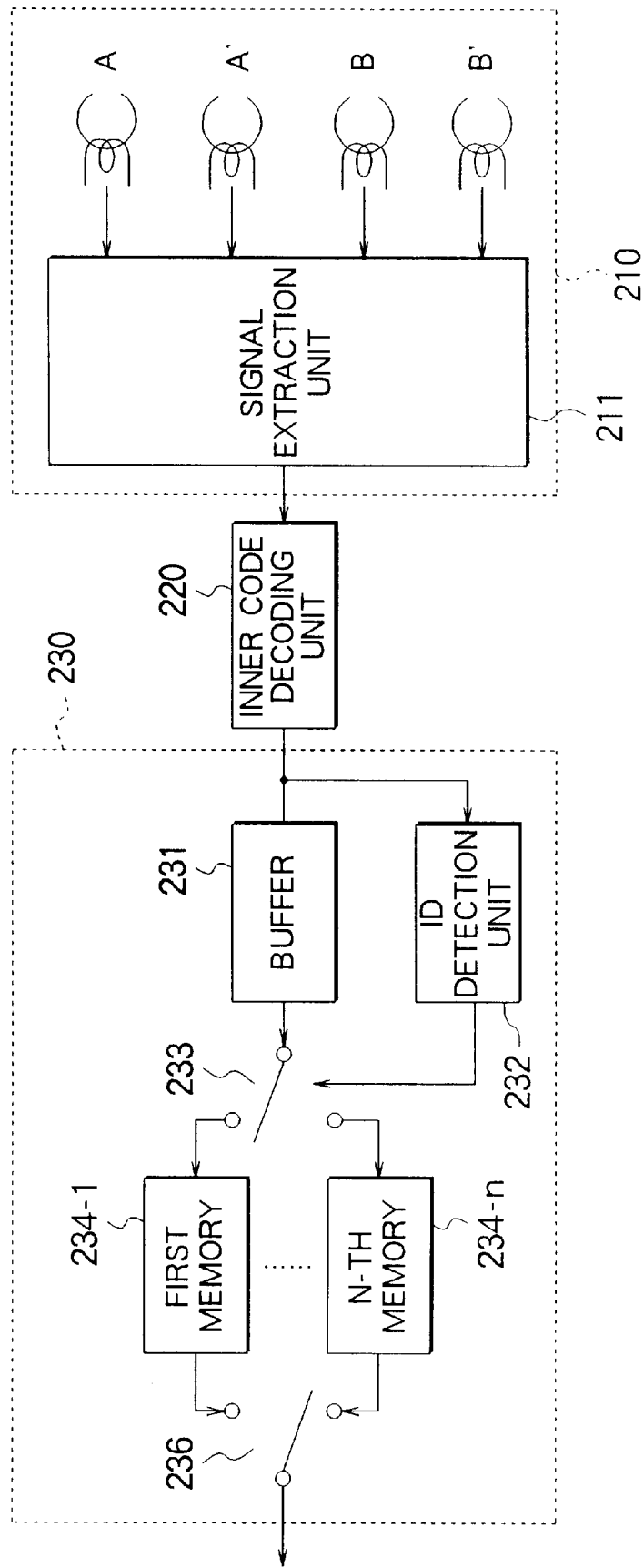
FIG. 6 is a view of the configuration of a reproduction unit and a nontracking control unit of the video data recording and reproducing apparatus shown in FIG. 1, as an example.

The configuration of the reproduction unit 210 and the nontracking control unit 230 will be shown in FIG. 6 in more detail.

Figure 7:
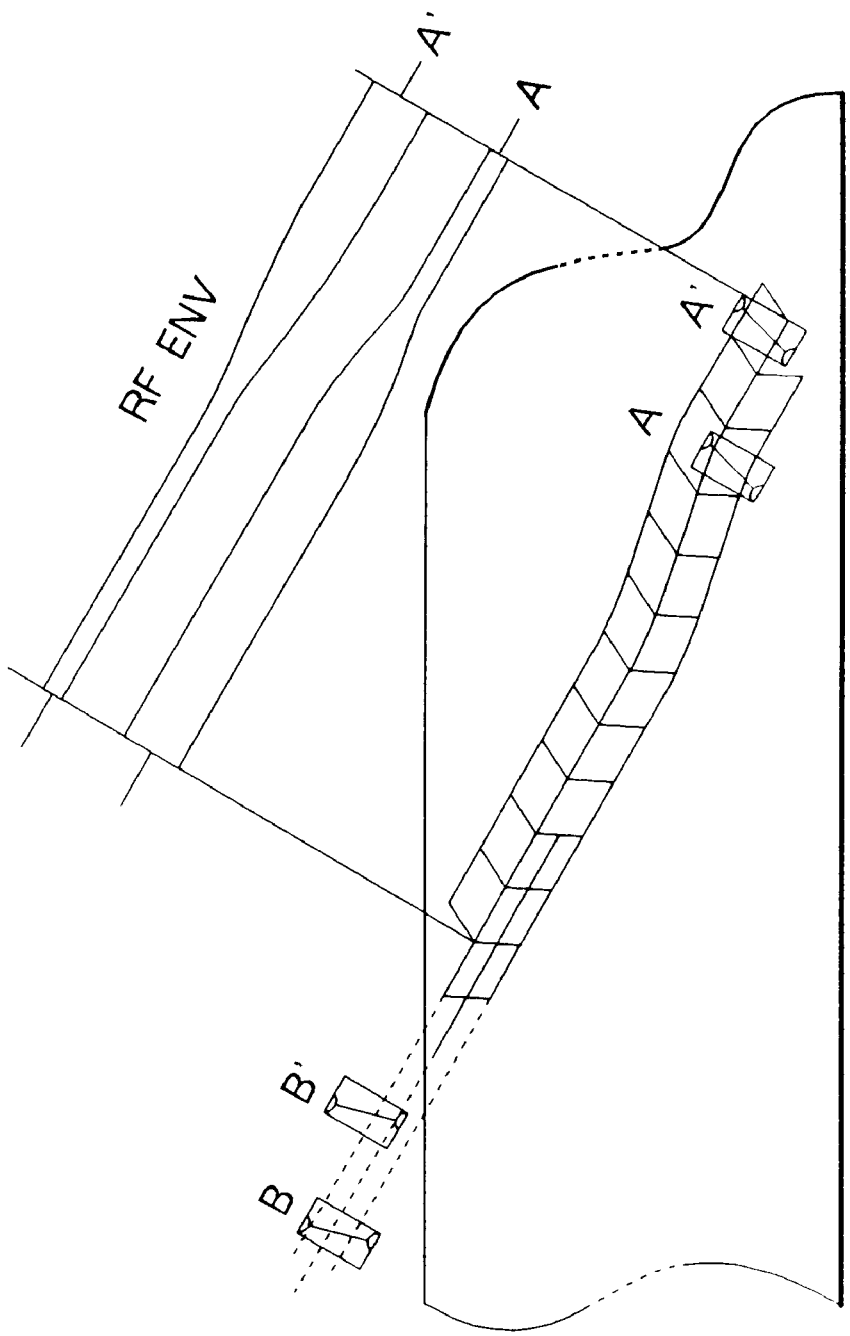
FIG. 7 is a view showing a scanning status on a slant track by a reproduction unit in the video data recording and reproduction apparatus shown in FIG. 1.

The reproduction unit 210 has four reproduction heads A, A', B, and B' and a signal extraction unit 211 which it uses to pick up the signal of each recording track of the video cassette tape 80 on which the video data are recorded. These four reproduction heads are mounted in a manner so that two playback (PB) heads (heads A and A' and heads B and B') of the same azimuth are offset by exactly an amount of the track width. Accordingly, as shown in FIG. 7, even if there is track bending, the reproduction of data can be carried out by at least one head (A or A' or B or B'). Therefore, the signals output from the head of this same azimuth are combined at the signal extraction unit 211 and output as one signal.

The inner code decoding unit 220 performs error correction based on the inner parity for every data block of the reproduction signal output from the reproduction unit 210 and sequentially outputs the data blocks to the nontracking control unit 230.

The nontracking control unit 230, as shown in FIG. 6, has a buffer 231, an ID detection unit 232, an input changeover switch 233, first to n-th memories 234-1 to 234-n, and an output changeover switch 236.

The buffer 231 is a storage means which temporarily stores the data block of the video data and the data block of the audio data from among the reproduction data blocks input from the inner code decoding unit 220.

The ID detection unit 232 detects the codes identifying the GOPs from the reproduction data blocks input from the inner code decoding unit 220, controls the input changeover switch 233 based on the result of detection, and appropriately records the reproduction data blocks temporarily stored in the buffer 231 in the first to n-th memories 234-1 to 234-n.

Specifically, the ID detection unit 232 performs the following operation.

First, on the video cassette tape 80, when a reproduction data block at a position near the boundary of the data for every GOP is input, that is, where the content of the reproduced system ancillary data is not always the correct data indicating the ID of the GOP of that region, the ID control unit 232 detects the ID from the reproduction data block and controls the input changeover switch 233 so that the reproduction data blocks having a common ID are recorded in a common memory 234-$i$ (i=1 to n).

Next, on the video cassette tape 80, when a reproduction data block at a position near the center of the data for every GOP is input, that is, where it is confirmed that the content of the reproduced system ancillary data is the correct data indicating the ID of the GOP of that region, the ID detection unit 232 detects the data for performing the nontracking control recorded in the system ancillary data and detects the ID of the correct GOP. Then, for each of the video data and audio data, the data blocks having a common ID with that correct ID are selected from the buffer 231 and subsequently input to the memory 234-$i$ (i=1 to n) to which the data blocks of that ID have been input heretofore.

At this time, the data blocks having an ID which is not common with this detected correct ID are not recorded in any memory 234 and are erased in the buffer 231. Also, the data which are detected as the correct ID the previous time and which have been recorded in the memory 234-$i$ (i=1 to n) heretofore are output from the nontracking control unit 230 to the outer code decoding unit 240 at this point of time. Further, also the data of the memory 234 in which data blocks having an ID other than the correct ID are recorded are erased. Accordingly, at the point of time when it is confirmed that the ID detected from the system ancillary data is correct, the data having the ID confirmed to be correct the previous time are output to the outer code decoding unit 240. Only the data having the ID confirmed to be correct this time are left and subsequently recorded.

Then, when the scanning on the video cassette tape 80 is further advanced and a reproduction data block at a position near the boundary of the data for every GOP is input again, the ID detection unit 232 detects the ID from the reproduction data block and controls the input changeover switch 233 again so that the reproduction data blocks having that common ID are recorded in the common memory 234-*i* (i=1 to n). At this time, in either memory 234-*i* (i=1 to n) of the first to n-th memories 234-1 to 234-*n*, the data blocks of the correct ID heretofore are recorded, so the data blocks having that ID are subsequently recorded in this memory 234-*i* (i=1 to n). Such a processing is repeated by the ID detection unit 232, whereby the data blocks having a suitable ID of GOP can be sequentially selected from the buffer 231.

Note that, a decision of whether a data block which is reproduced at the reproduction unit 210 and input via the inner code decoding unit 220 is data of that position on the video cassette tape 80, that is, a data block at a position near the boundary of the data for every GOP or a data block of a position near the center of the data for every GOP, is controlled by the control unit of the illustrated video data recording and reproducing apparatus 10.

The input changeover switch 233 is a selecting means for storing the data blocks temporarily stored in the buffer 231 in the first to n-th memories 234-1 to 234-*n* and operates based on the control signal input from the ID detection unit 232.

The first to n-th memories 234-1 to 234-*n* are memories for recording the reproduction signal input from the buffer 231 via the input changeover switch 233. Basically, the data blocks having a common identification code in the reproduced data blocks are recorded in one memory.

The output changeover switch 236 is a selection circuit which selects the output data from the nontracking control unit 230, selects either memory of the first to n-th memories 234-1 to 234-*n*, and enables the reading from the outer code decoding unit 240.

The outer code decoding unit 240 reads the data recorded in the memory of the nontracking control unit 230, performs the error correction based on the outer parity for every type of signal for every GOP, and sequentially stores the data as a result of this in the memory unit 250.

The memory unit 250 is a memory storing the data for every GOP which is reproduced by the video cassette tape 80 and subjected to the error correction by the inner parity and outer parity.

The data pack portion 260 recovers the encoded data train for every macro block of each GOP as shown in FIG. 2B from the data of each data block stored in the memory unit 250, outputs the video data to the decoding unit 270, and outputs the audio data from the audio output terminal Aout.

The decoding unit 270 decodes and decompresses the compressed and encoded video data input from the data pack portion 260 and outputs the result as the ordinary video signal from the video output terminal Vout.

Next, an explanation will be made of the operation of the video data recording and reproducing apparatus 10.

The video signal input from the video input terminal Vin of the recording system 100 is encoded for every GOP of every two frames in the encoding unit 110 and output as the video bit stream. The video bit stream and the audio data input from the audio input terminal Ain are arranged in predetermined data recording regions of the data blocks as shown in FIGS. 3A to 3C in the data pack portion 120. Then, the outer parity is given to this data in the outer code encoding unit 150.

Also, a code identifying each GOP is generated in the ID generation unit 160 and given to each data block in the ID addition unit 170. Each data stream given the GOP identification code is further given an inner parity in the inner code encoding unit 180 and recorded on the video cassette tape 80 by the recording unit 190. Also, the identification codes given to this video data and audio data are recorded also in the system ancillary data and recorded together with the video data and audio data on the video cassette tape 80.

On the video cassette tape 80, the predetermined number of tracks are assigned to the respective data for every GOP and sequentially recorded. Also, in each frame, as shown in FIG. 4, two data recording regions are assigned for every type of the data, and the respective data are recorded in the respective recording regions. Also, for the system ancillary data, the same data is recorded overlappingly in each of the two regions a plurality of times.

The video cassette tape 80 is subjected to nontracking reproduction in the reproduction system 200. First, for the video data recorded on the video cassette tape 80, the video data recording and reproducing apparatus 10 picks up the signal by two heads of the same azimuth as shown in FIG. 7 deviated from each other by one frame and combines the outputs of the two heads by the signal extraction unit 211 to generate the reproduction signal. Then, it performs the error correction by utilizing the inner parity in the inner code decoding unit 220 and outputs the resultant signal to the nontracking control unit 230.

An explanation will next be made of the operation of the nontracking control unit 230 referring to FIG. 8.

Figure 8:
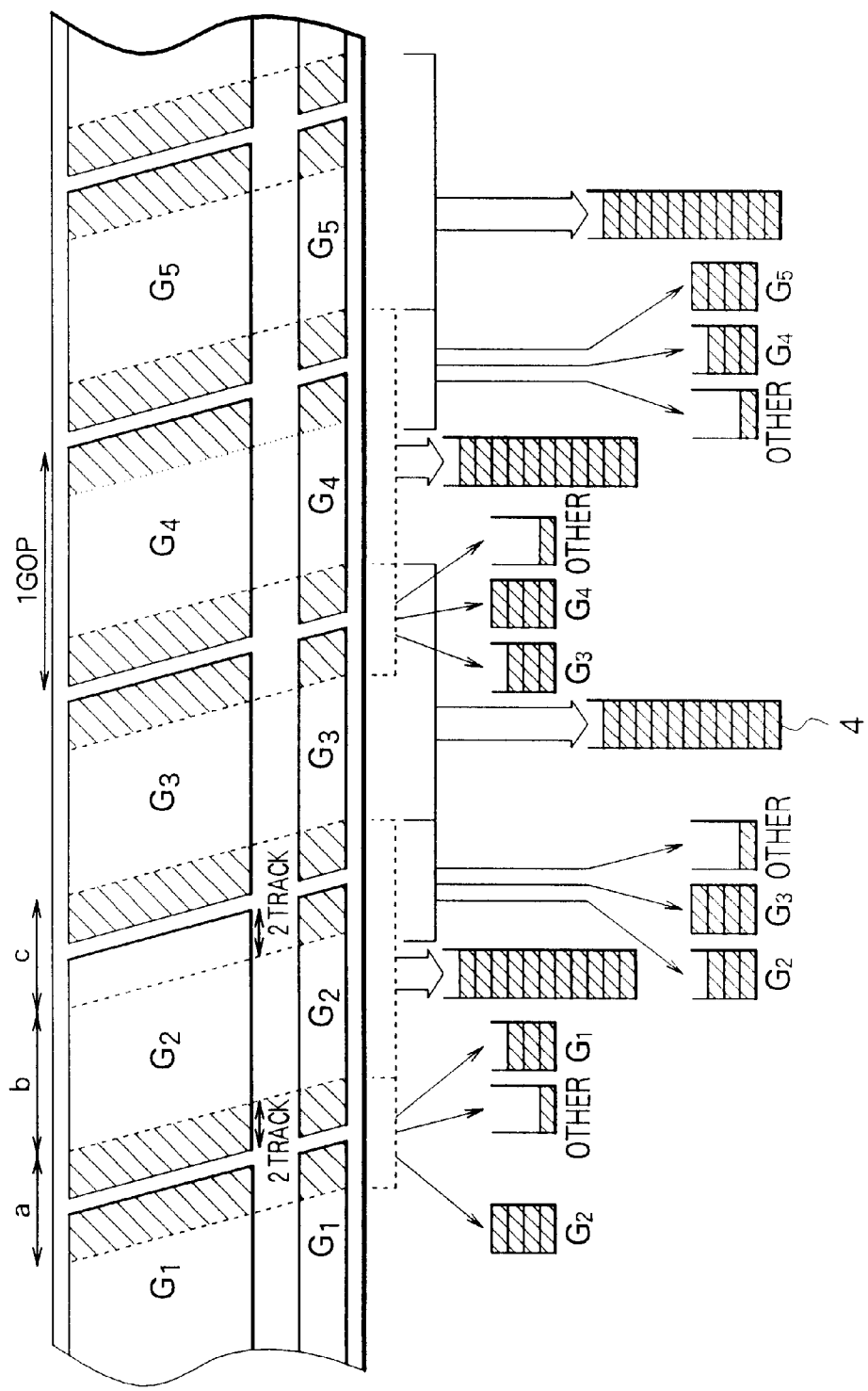
FIG. 8 is a view explaining the operation of the nontracking control unit of the video data recording and reproducing apparatus shown in FIG. 1.

Note, as the prerequisite condition of this embodiment, there is a possibility of the tracking shift up to the maximum two mechanical inaccuracy of the position of a control (CTL) head which is used for recording a control signal in a longitudinal direction of the video cassette tape 80, and the bending of the slant tracks by expansion and/or shrinkage of the video cassette tape 80.

Where the video cassette tape 80 as shown in FIG. 8 on which the data added with the GOP identification codes of G1 to G5 are recorded is reproduced from, for example, at the reproduction of the region a, there is a possibility that the data will be reproduced with a deviation of an offset length from CTL to the helical frame, but no deviation occurs up to the portion of the region b. Accordingly, it is enough to detect the reference ID inherent in the GOP based on the system ancillary data reproduced in the region b of FIG. 8.

Specifically, a correct reference ID cannot be detected for the reproduction signal of the region a, so the data blocks having all of the detected IDS are selected and stored in the first to n-th memories 234-1 to 234-*n* so that the IDs become the same. Then, if the reference ID of the GOP is determined in the ID detection unit 232 based on the reproduction signal of the track of the region b, it can be decided that only the data block having this ID is the correct data block, and therefore that data block is stored in the memory 234-*i* (i=1 to n) among the first to n-th memories 234-1 to 234-*n* which stores the data block of that ID. The data blocks having other IDS are not input to the memory 234 and are erased in the buffer 231.

Then, when the reproduction of the track of the region c starts, the data blocks having an ID the same as the reference ID are subsequently stored in that memory. At the same time, the data blocks having other IDs are recorded to the memory 234-$i$ ($i=1$ to n). Namely, the data is divided by an appropriate selection by the input changeover switch 233 so that the IDs become the same.

When the reproduction of the region c is ended, the data block of the GOP of the ID G2 is no longer reproduced, so the output changeover switch 236 is controlled and the content of that memory is output to the outer code decoding unit 240. Also, at that point of time, the reference ID of the next GOP is determined, so only the GOP having that ID is stored in that memory 234-$i$ ($i=1$ to n) this time, whereby the reproduction for every GOP is sequentially carried out.

In this way, in the video data recording and reproducing apparatus 10 of the present embodiment, the ID identifying the GOP is given for every data block and recorded and the reproduction is carried out while deciding which GOP should be reproduced, so even if nontracking reproduction is carried out and misplacing of the data blocks etc. occurs among the adjoining plurality of tracks, the data can be collected for every GOP and the video data can be adequately reproduced.

Also, in the present embodiment, since nontracking reproduction is possible, the apparatus can be simplified and an inexpensive tape medium can be used.

Also, in the present embodiment, the system ancillary data having the reference GOP data is recorded on the recording track on the tape medium together with the video data, so the ID of the GOP of the data block which should be reproduced from each recording track can be quickly detected.

Also, in the present embodiment, the ID of the GOP can be individually set for each of the video data and the audio data of a plurality of channels, therefore an adequate countermeasure can be taken even in a case where only either data is rewritten later.

Modifications of First Embodiment

Note that, the present invention is not limited to the present embodiment. Various modifications are possible.

For example, in the present embodiment, the present invention was explained with reference to a video data recording and reproducing apparatus having both a recording unit for recording video data on a tape medium and a reproduction unit for reproducing the video data recorded on the tape medium, but it is clear that also a video data recording apparatus performing only the recording of the video data and a video data reproducing apparatus performing only the reproduction of the recorded data are within the scope of the present invention.

Also, as the recording medium, a video cassette tape was used, but the present invention can be applied to any medium so long as a tape is used as the recording medium.

Also, in the present embodiment, codes identifying the GOP are given to the respective data blocks of the video data and the audio data of every channel for recording of the data and further the system ancillary data having that identification code as the data was recorded together with these data. However, the present invention is characterized in that each video and audio data has an identification code for every GOP. It is also possible to execute the present invention by a method that does not record system ancillary data having an identification code as the data.

An explanation will be made of such a recording and reproduction by referring to FIG. 9 and FIG. 10.

Figure 9:
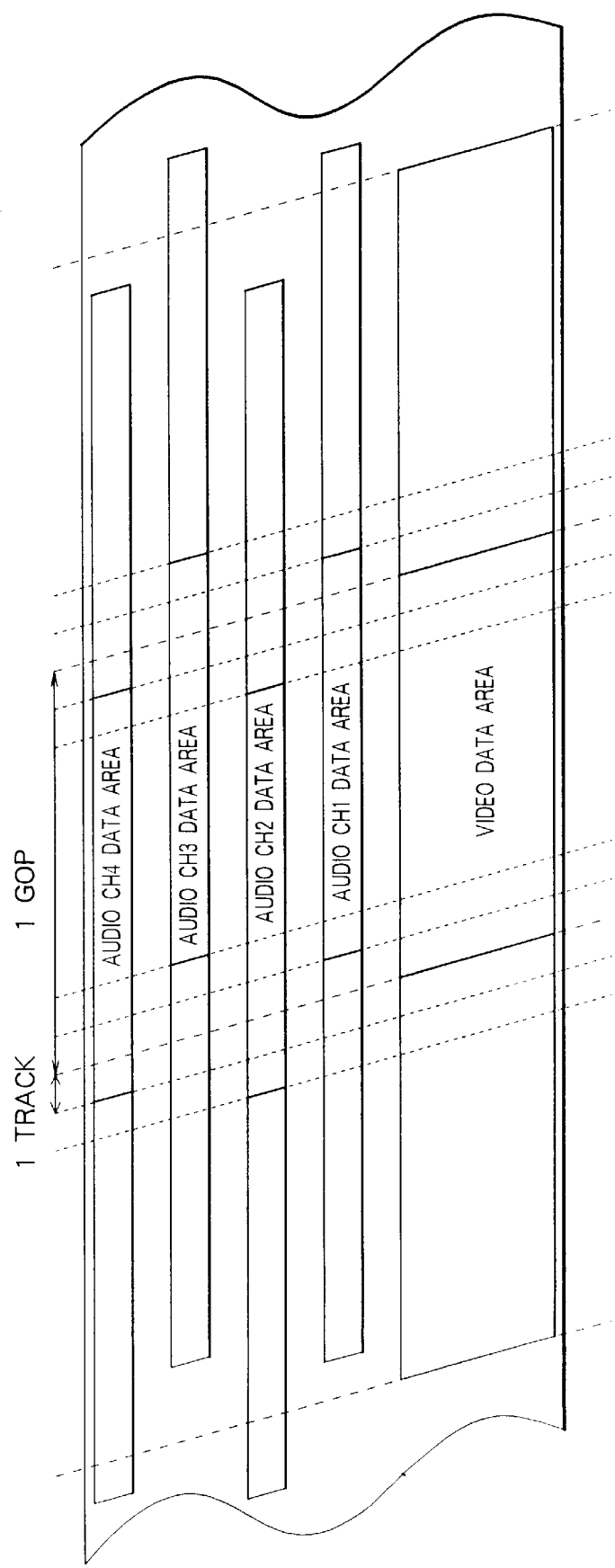
FIG. 9 is a view of another example of the format of video data and audio data recorded on the tape by the video data recording and reproduction apparatus shown in FIG. 1.
Figure 10:
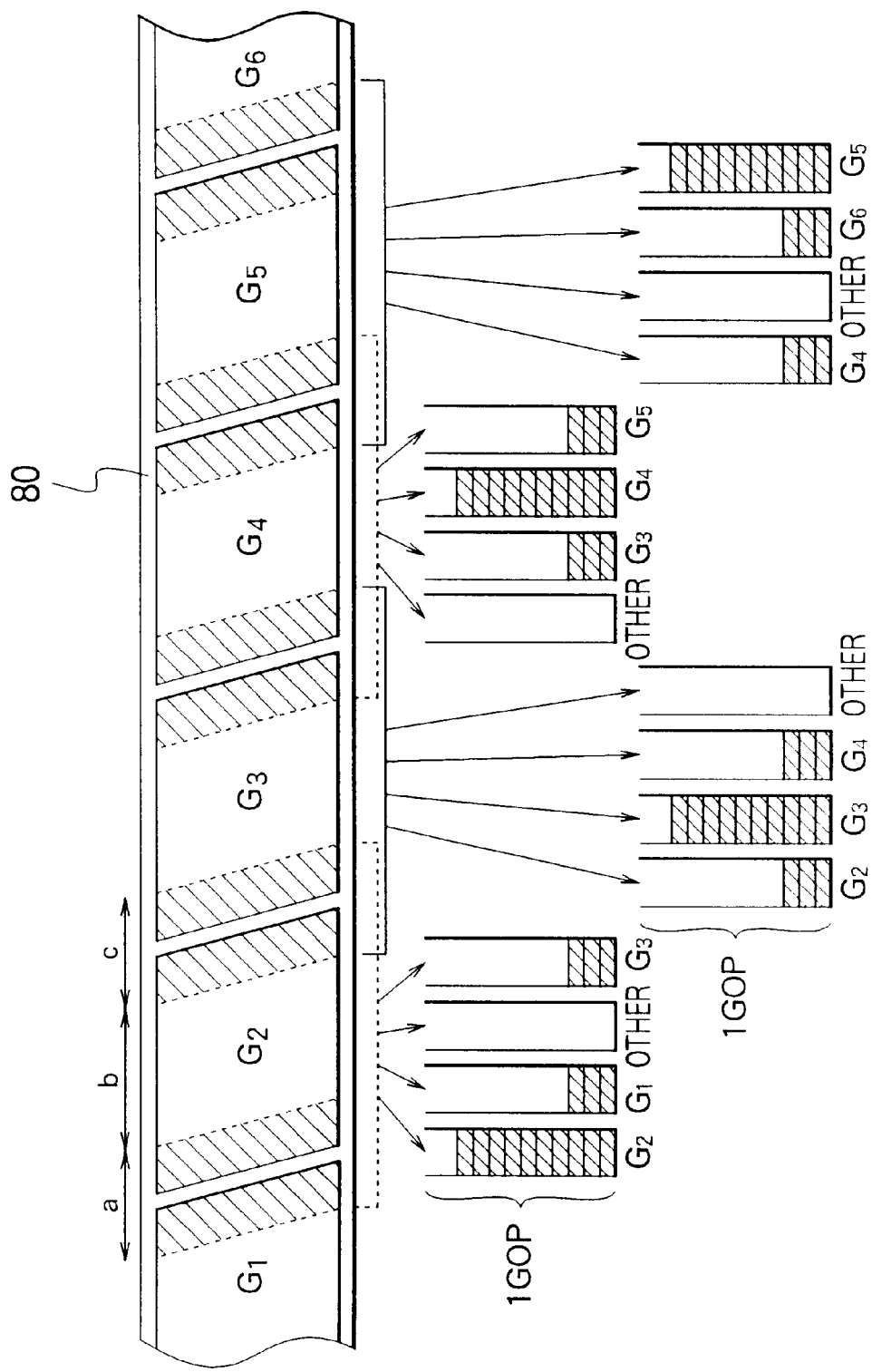
FIG. 10 is a view explaining another example of the operation of the nontracking control unit of the video data recording and reproducing apparatus shown in FIG. 1.

FIG. 9 is a view of the recording state of the data to a tape medium in which the recording of such system ancillary data is not carried out; and FIG. 10 is a view explaining the method of reproducing such data.

As shown in FIG. 9, similar to the above-described embodiment, the video data and audio data encoded for every GOP are respectively recorded at the predetermined regions of a predetermined number of tracks.

At the time of reproduction, for all of the regions of the region a, region b, and region c of FIG. 10, that data is distinguished based on the ID recorded in each data block. Namely, the data blocks are sequentially stored for every ID in a plurality of memories. When the classification is ended for the reproduction signal of the region c, the data blocks having the largest number of data blocks at that point of time are decided to be the data blocks of the GOP of that region, and the data blocks recorded in that memory are output.

By sequentially repeating this processing, the GOP data having identification codes G1 to G6 are sequentially reproduced in FIG. 10. Note, in this case, the system ancillary data is not used, so it is necessary to perform the majority decision for every GOP for every channel of video data and audio data.

Also, the configuration of the storage means such as the memory unit 130 of the recording system 100, the memory unit 250 of the reproduction system 200, the memory 234-$i$ ($i=1$ to n) of the nontracking control unit 230, etc. can be any configuration. For example in the memory 234-$i$ ($i=1$ to n) of the nontracking control unit 230, a configuration where n number of memories are provided is adopted, but it is also possible to actually provide n number of independent data storage means and possible to substantially provide n number of storage means by dividing one storage region and memory space to n number of areas.

Further, it is possible to impart the identification code for every GOP and an optional code for every type of data of GOP.

According to the first embodiment, there is provided a data recording apparatus and recording method which can record data on a recording medium so that video data that is encoded for every GOP can be substantially reproduced by a simple tracking control such as nontracking reproduction. Due to this, a variety of video data recording apparatuses which can efficiently record video data at a low cost can be realized.

Also, according to the first embodiment, there is provided a recording medium on which the video data coded for every GOP are recorded so that the data can be substantially reproduced by simple tracking control such as nontracking reproduction.

Also, according to the first embodiment, there is provided a reproducing apparatus which can reproduce from a recording medium on which video data encoded for every GOP are recorded substantially by simple tracking control such as nontracking reproduction and a method thereof.

Second Embodiment

A video data recording and reproducing apparatus of a second embodiment of the present invention will be described.

Figure 11:
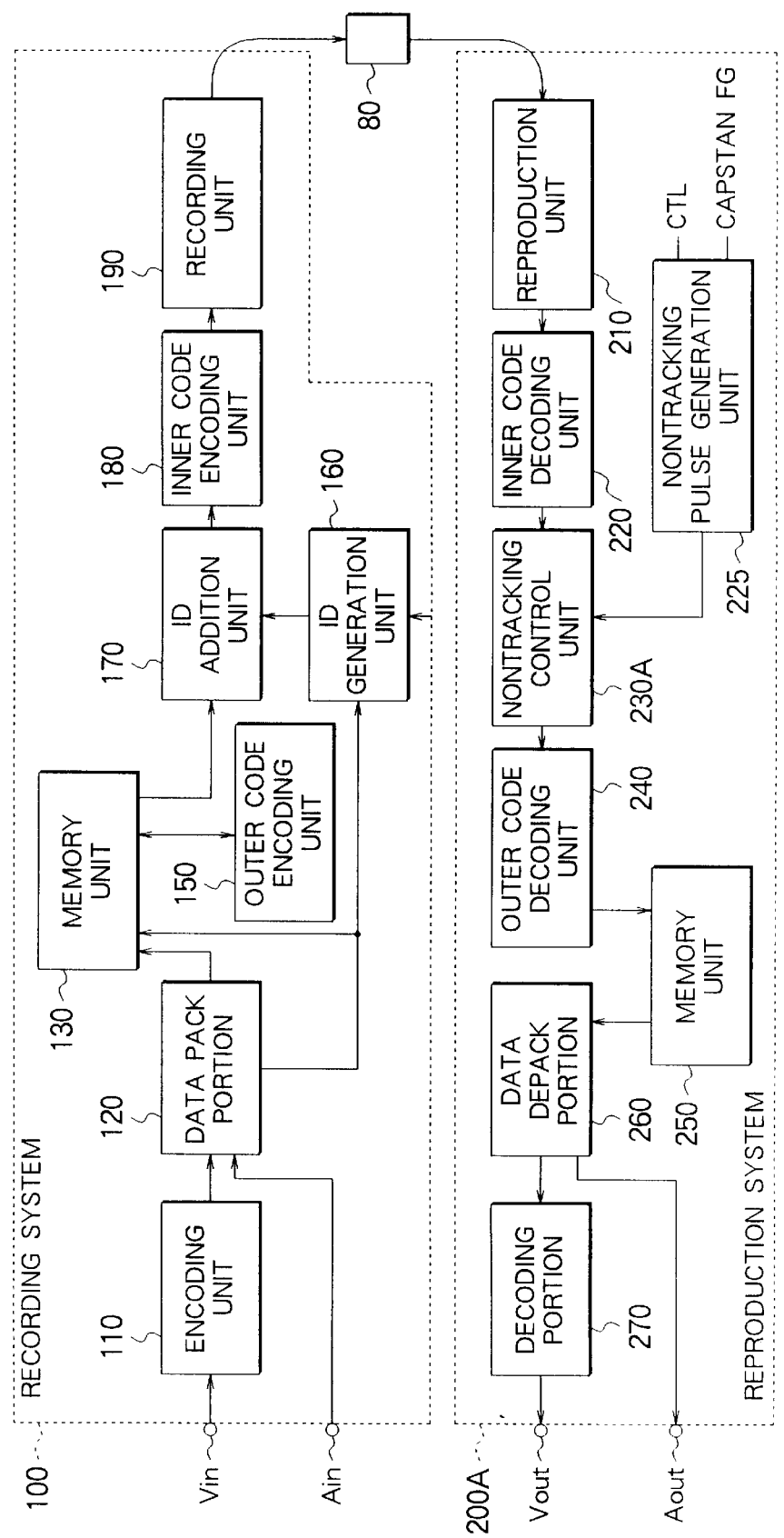
FIG. 11 is a block diagram of another embodiment of a video data recording and reproduction apparatus of the present invention.
Figure 13:
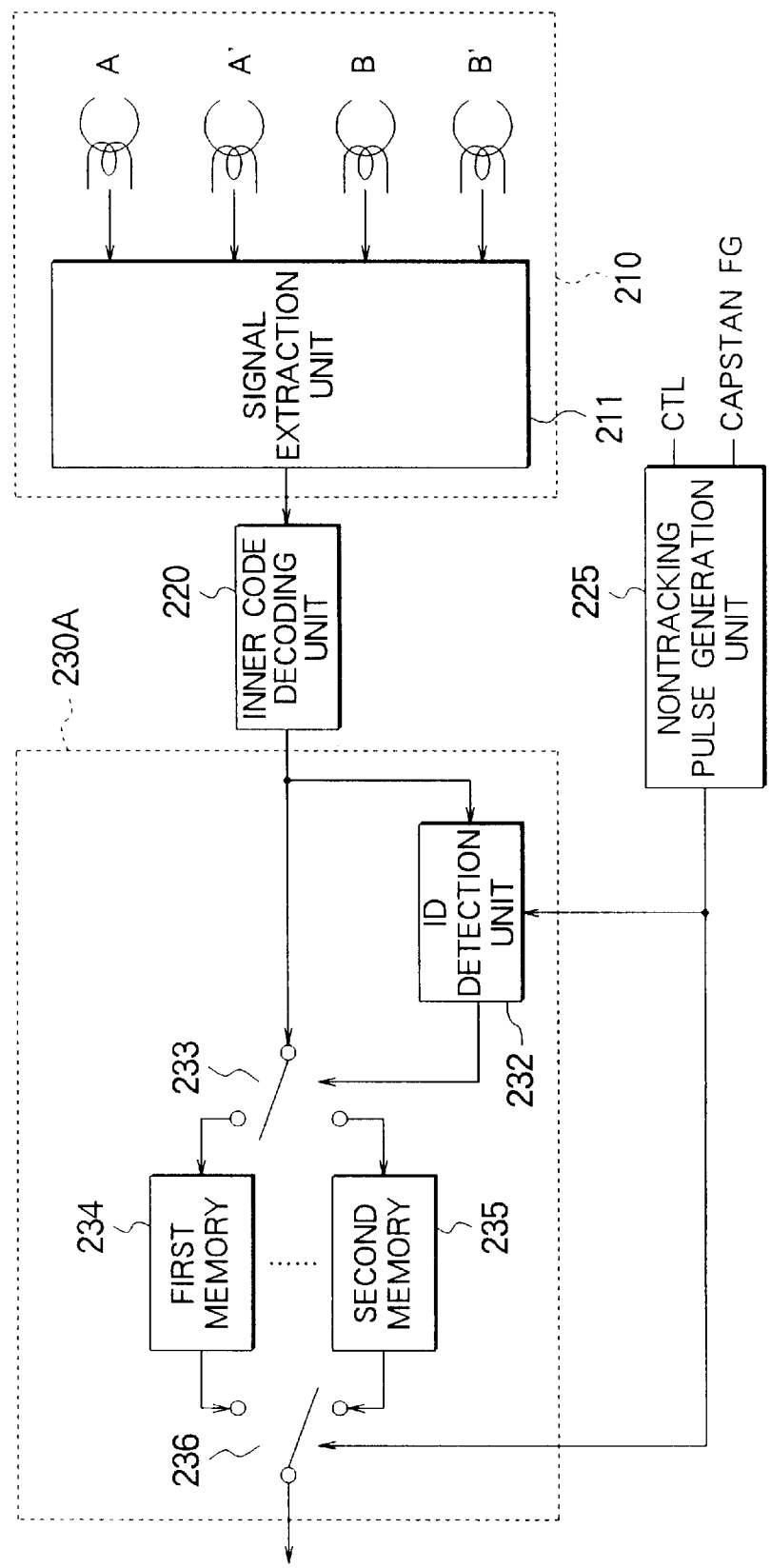
FIG. 13 is a block diagram as an example of a reproduction unit and a nontracking control unit of the video data recording and reproduction apparatus shown in FIG. 11.

The video data and reproducing apparatus 10A of the second embodiment shown in FIG. 11 comprises a recording system 100 which is substantially identical to the recording system 100 shown in FIG. 1, and a reproduction system 200A which is additionally provided which a nontracking pulse generation unit 225 to the reproduction system 200 shown in FIG. 1, and in which a nontracking control unit 230A shown in FIGS. 11 and 13 differs from the nontracking control unit 230 shown in FIGS. 1 and 6

An explanation will be made of the configuration of the reproduction system 200A.

The reproduction system 200A has the reproduction unit 210, the inner code decoding unit 220, the nontracking pulse generation unit 225, the nontracking control unit 230A, the outer code decoding unit 240, the memory unit 250, the data depack portion 260 and the decoding unit 270. Note that, the configuration of the reproduction unit 210, the nontracking control unit 230 and the nontracking pulse generation unit 225 will be shown in more detail by FIG. 13.

The nontracking pulse generation unit 225 generates a nontracking pulse indicating the vicinity of the boundary of the GOP based on the control signal CTL recorded on the video cassette tape 80 and a capstan FG (Frequency Generator) signal. This generated nontracking pulse is output to the nontracking control unit 230 and used for the control of the ID detection unit 232 and the output changeover switch 236 mentioned later.

An explanation will be made next of this nontracking pulse by referring to FIGS. 12A to 12D.

Figure 12:
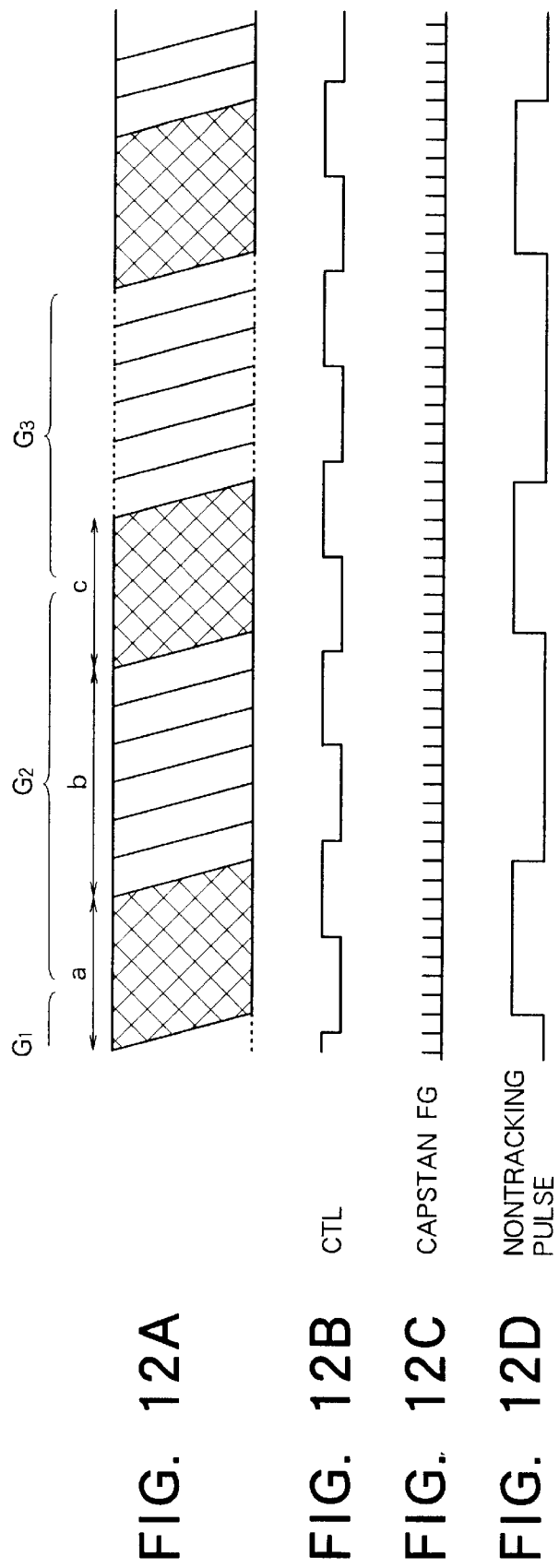
FIGS. 12A to 12D are views explaining the operation of a nontracking pulse generation portion of the video data recording and reproduction apparatus shown in FIG. 11.

FIGS. 12A to 12D are views explaining the nontracking pulse, in which FIG. 12A is a view of the recording track of the video cassette tape 80; FIG. 12B is a view of the control signal CTL; FIG. 12C is a view of a capstan FG signal; and FIG. 12D is a view of a nontracking pulse.

In the present embodiment, by using as a reference the point of time when the state of the control signal CTL shown in FIG. 12B and the capstan FG signal shown in FIG. 12C becomes the predetermined state, the pulse of the capstan FG signal is counted and a predetermined delay is given, etc., whereby a nontracking pulse which becomes "1" in the region of every 2 tracks at the boundary of the GOP is generated.

The time when this nontracking pulse becomes "1" is a period during which there is a possibility that the data of a plurality of GOPs will be reproduced. Also, the period during which the nontracking pulse becomes "0" from "1" and becomes "1" again becomes a period during which there is a possibility that the data of a specific GOP is reproduced.

The nontracking control unit 230A, as shown in FIG. 13, has the ID detection unit 232, the input changeover switch 233, the first memory 234, a second memory 235, and the output changeover switch 236.

Compared with the nontracking control unit 230 shown in FIG. 6 and the nontracking control unit 230A shown in FIG. 13, the buffer 231 is omitted and only two memories 234 and 235 are provided, by providing the nontracking pulse generation unit 225.

Figure 3D:
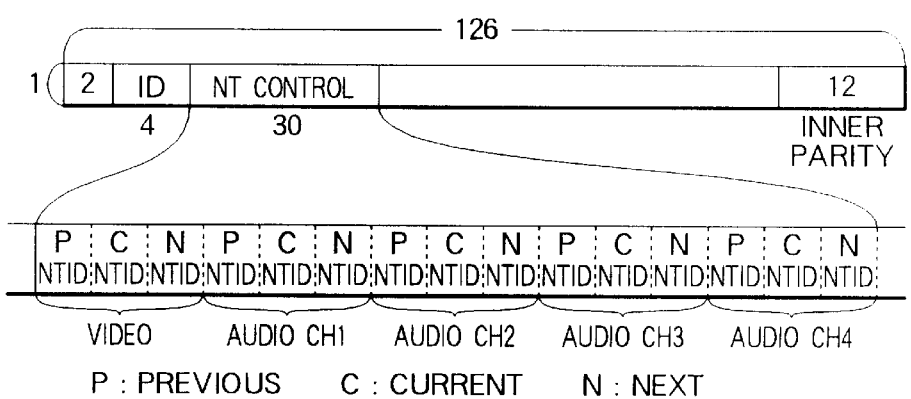

The ID detection unit 232 reads the ID for every GOP as shown in FIG. 3D from the system ancillary data input from the inner code decoding unit 220 and controls the input changeover switch 233 so that the data of the GOP which is to be reproduced at present and the data of the GOP which is to be reproduced next are suitably recorded in the first memory 234 and the second memory 235.

An explanation will be made of this processing referring to FIG. 14.

Figure 14:
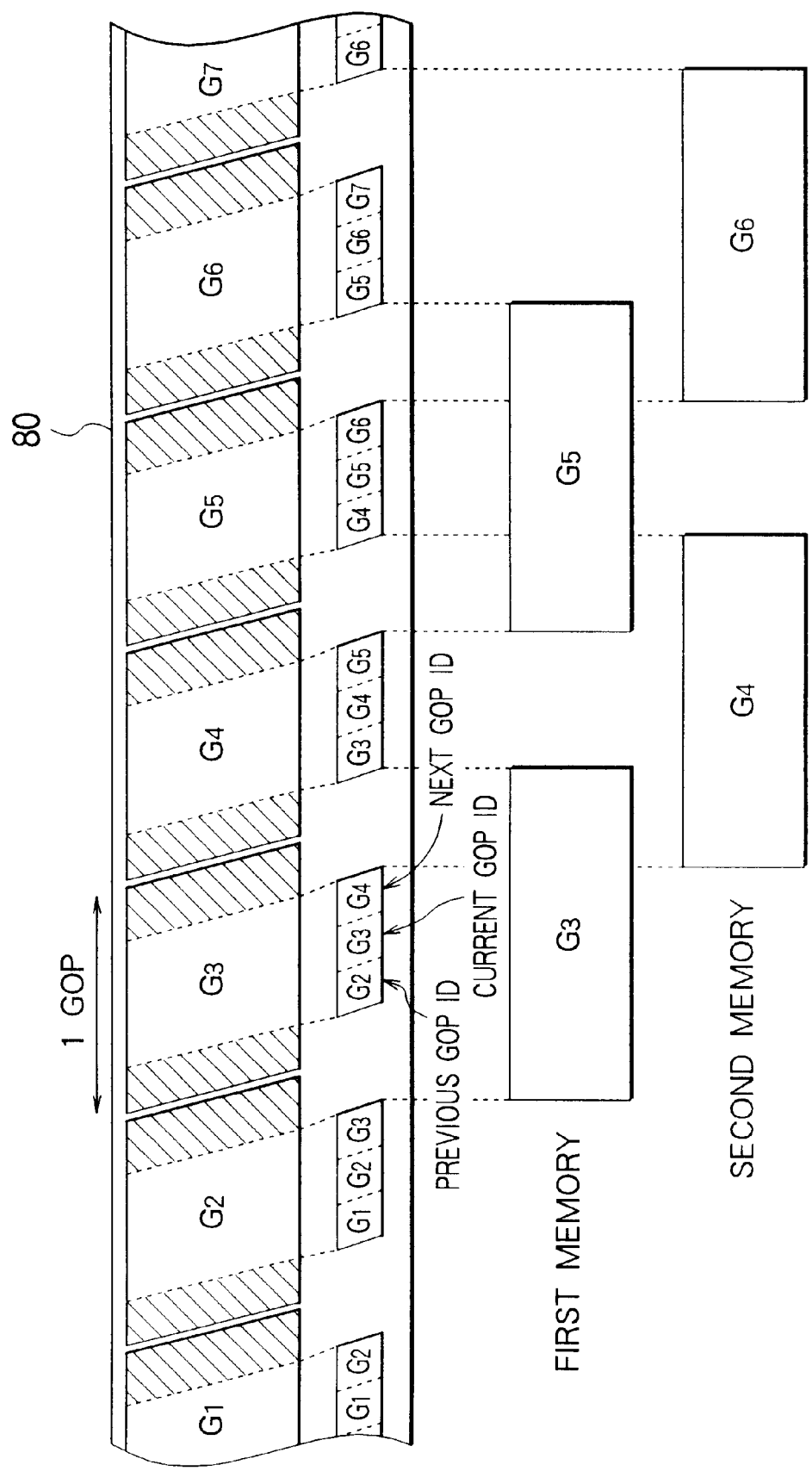
FIG. 14 is a view showing the reproduction operation of the video data recording and reproduction apparatus shown in FIG. 11.

For example, when the GOP3 of FIG. 14 is reproduced, the ID detection unit 232 detects that the ID of the GOP which is to be reproduced at present is G3 and the ID of the GOP which is to be reproduced next is G4 from the system ancillary data shown in FIG. 3D. Then, it controls the input changeover switch 233 so that the data blocks having the identification code G3 are input to the first memory 234 and the data blocks of the identification code G4 are input to the second memory 235, respectively, with respect to the data blocks of the video data and the audio data input from the inner code decoding unit 220.

Subsequently, similarly, when the GOP4 is reproduced, it is detected that the ID of the GOP which is to be reproduced at present is G4 and the ID of the GOP which is to be reproduced next is G5, and the input changeover switch 233 is controlled so that the data blocks having the identification code G4 are subsequently input to the second memory 235, and the data blocks having the identification code G5 are input to the first memory 234, respectively.

Note that, the changeover of ID between the GOP which is to be reproduced at present and the GOP which is to be reproduced next is carried out based on the nontracking signal as shown in FIG. 12D input from the nontracking pulse generation unit 225.

The input changeover switch 233 is a changeover means for storing the video data and audio data input from the inner code decoding unit 220 to the nontracking control unit 230 in the first memory 234 and the second memory 235 and operates based on the control signal input from the ID detection unit 232.

The first memory 234 and the second memory 235 are memories recording the reproduction signal input from the inner code decoding unit 220 via the input changeover switch 233. Basically, the data of the GOP which is to be reproduced at present will be recorded in one of the memories, and the data of the GOP which is to be reproduced next will be recorded in the other memory.

The output changeover switch 236 is a selection circuit which selects the output data from the nontracking control unit 230, selects either of the first memory 234 or the second memory 235, and enables the reading from the outer code decoding unit 240. The output of the data to the outer code decoding unit 240 at this time is alternately carried out for the first memory 234 and the second memory 235 during a period when the nontracking signal input from the nontracking pulse generation unit 225 as shown in FIG. 12D is "0".

The outer code decoding unit 240 shown in FIG. 11 reads the data recorded in the memory of the nontracking control unit 230, performs the error correction based on the outer parity for every type of signal for every GOP, and sequentially stores the data as a result of this in the memory unit 250.

The memory unit 250 shown in FIG. 11 is a memory storing the data for every GOP which is reproduced by the video cassette tape 80 and subjected to the error correction by the inner parity and outer parity.

The data depack portion 260 shown in FIG. 11 recovers the encoded data train for every macro block of each GOP as shown in FIG. 2B from the data of each data block stored in the memory unit 250, outputs the video data to the decoding unit 270, and outputs the audio data from the audio output terminal Aout.

The decoding unit 270 shown in FIG. 11 decodes and decompresses the compressed and encoded video data input from the data depack portion 260 and outputs the result as the ordinary video signal from the video output terminal Vout.

An explanation will be made of the operation of the video data recording and reproducing apparatus 10A shown in FIG. 11.

The video signal input from the video input terminal Vin of the recording system 100 is encoded for every GOP of every two frames in the encoding unit 110 and output as the video bit stream. The video bit stream and the audio data input from the audio input terminal Ain are arranged in predetermined data recording regions of the data blocks as shown in FIGS. 3A, 3B and 3D in the data pack portion 120. Then, the outer parity is given to this data in the outer code encoding unit 150.

A code identifying each GOP is sequentially generated in the ID generation unit 160 and given to each data block in the ID addition unit 170. Each data stream given the GOP identification code is further given an inner parity in the inner code encoding unit 180 and recorded on the video cassette tape 80 by the recording unit 190.

The identification codes given to this video data and audio data are recorded as the system ancillary data of each GOP. At this time, the identification codes given to the video data and the audio data of the GOPs before and after this are recorded together with the identification codes given to the respective data of the GOP. Then, this system ancillary data is recorded together with the video data and the audio data.

On the video cassette tape 80, the predetermined number of tracks are assigned to the respective data for every GOP and sequentially recorded. Also, in each frame, as shown in FIG. 4, two data recording regions are assigned for every type of the data, and the respective data are recorded in the respective recording regions. Also, for the system ancillary data, the same data is recorded overlappingly in each of the two regions a plurality of times.

The video cassette tape 80 on which the data are recorded is subjected to nontracking reproduction in the reproduction system 200. First, for the video data recorded on the video cassette tape 80, in the video data recording and reproducing apparatus 10, the signal is picked up by the two rotary heads of the same azimuth as shown in FIG. 13 deviated from each other by the amount of one frame, the outputs of the two heads are combined by the signal extraction unit 211, and the reproduction signal is generated. Then, the error correction is carried out by utilizing the inner parity in the inner code decoding unit 220 and the resultant signal is output to the nontracking control unit 230.

The ID detection unit 232 of the nontracking control unit 230 extracts the identification code of the respective data of the GOP which is to be reproduced at present and the identification code of the respective data of the GOP which is to be reproduced next from the system ancillary data input from the inner code decoding unit 220. Then, the data of the GOP which is to be reproduced at present and the data of the GOP which is to be reproduced next are selected from among the video data and the audio data input from the inner code decoding unit 220 to the nontracking control unit 230 by referring to the ID set in the respective data blocks. They are input to the first memory 234 or the second memory 235.

Then, the data recorded in either the first memory 234 or the second memory 235 are sequentially read out for every period for which the nontracking pulse generated in the nontracking pulse generation unit 225 is "0", the error correction is carried out by using the outer parity at the outer code decoding unit 240, and the video data for every GOP are recorded in the memory unit 250.

The video data recorded in the memory unit 250 are opened in the data pack portion 260. For example, the video data are converted to the data train for every macro block as shown in FIG. 2(B). Then, the audio data are output from the audio output terminal Aout. Also, the video data are decoded at the decoding unit 270 and output from the video output terminal Vout.

In this way, in the video data recording and reproducing apparatus 10A of the present embodiment, the identification code of the GOP which is to be reproduced next and the identification code of the GOP immediately before this in time are recorded in the system ancillary data of the GOP which is reproduced at present, so even in a case where the data of a plurality of GOPs are reproduced mixed at the boundary portion of the data for every GOP, the necessary data can be suitably selected and extracted while being divided.

Also, the correct identification code of the GOP which is to be reproduced next is known in advance, so it is possible to immediately select the data blocks which are to be reproduced from among the data blocks reproduced from the first track of the GOP. Namely, it is not necessary to temporarily record a predetermined recording tracks' worth of data in a buffer etc. Accordingly, the buffer becomes unnecessary, so the apparatus configuration becomes simpler and in addition also the processing becomes easier, so high speed processing becomes possible.

Further, in the system ancillary data of The GOP being reproduced at present, the identification code of the GOP immediately before this in time is also recorded, so even in a case where the video data are reversely reproduced, they can be reproduced suitably and further at a high speed similar to the usual reproduction.

Since this nontracking pulse generation unit 225 is a simple circuit and further this video data processing apparatus 10 can perform nontracking reproduction, a VCR having a simple configuration can be provided.

Third Embodiment

As a third embodiment of the present invention, an explanation will be made of a video data recording and reproducing apparatus which can suitably perform editing processing for updating the data of one part of the recording medium on which the video data has been already recorded, with reference to FIGS. 15A to 15F and FIGS. 16A to 16D.

Note that, the configuration of the video data recording and reproducing apparatus of the third embodiment and the operation of the recording and reproduction are the substantially same as those of the video data recording and reproducing apparatus 10A of the second embodiment, so explanations of the configuration will be omitted.

In the video data recording and reproducing apparatus of the third embodiment, as the identification code for every GOP which is given to each data block of the video data and recorded in the system ancillary data, a code identifying the GOP and, at the same time, indicating the history of that data is given. When updating part of the data of the GOP, the code identifying the GOP is used as it is, and only the code indicating the history of the data is updated.

Note that the code identifying the GOP and the code indicating the history of the data can be considered overall to be the GOP identification code in the second embodiment. In this case, also the format of the data block shown in FIGS. 3A, 3B and 3D may be the same as those of the second embodiment.

An explanation will be made next of the operation of the video data recording and reproducing apparatus of the third embodiment by referring to FIGS. 15A to 15f and FIGS. 16A to 16D.

FIG. 15A is a view of the video data recorded by the video data processing apparatus of the third embodiment. This video data is recorded on a predetermined recording track for every GOP and a code identifying that GOP is given to the data for every GOP. This identification code is comprised of an ID which is unique for every GOP (GOPID) and an ID which is unique for every editing processing executed (hereinafter, referred to as a history ID). In the example of FIG. 15A, a state where codes from "A" to "D" are repeatedly given as the GOPID, "3" is given as the history ID, and the identification codes of "3A" to "3D" are given in total is exhibited.

An explanation will be made of the editing processing for updating part of such recording data by another video data comprised of three GOPs as shown in FIG. 15B. When the data as shown in FIG. 15B is inserted between an IN point and an OUT point of the video data as shown in FIG. 15A, particularly in the case of the nontracking processing, there exists a case where track deviation is caused as in FIG. 15C and FIG. 15D.

FIG. 15C is a view showing a case where the newly recorded data is recorded deviated in the forward direction (IN point direction) with respect to the underlying data and, as a result, data which is left without being erased, given the identification code "3C", exists near the OUT point.

Also, FIG. 15D is a view showing a case where the newly recorded data is recorded deviated in the backward direction (OUT point direction) with respect to the underlying data and, as a result, data which is left without being erased, given the identification code "3A", exists near the IN point.

Where the editing of the video data is carried out in this way, in the video data processing apparatus of the third embodiment, the GOPID gives the same ID as the underlying ID with respect to the inserted video data, and the history ID gives the ID incremented by one with respect to the history ID of the underlying GOP. Namely, in the example of FIGS. 15C and 15D, identification codes of "4A, 4B, 4C" are given.

Further, when the video data as shown in FIG. 15E is inserted with respect to the once edited video data as shown in FIG. 15D and the data is recorded deviated in the backward direction, a recording state of the video data as shown in FIG. 15F is exhibited. Also, with respect to each GOP of this video data, similar to that described before, the same ID as the underlying ID is given to the GOPID, and an ID incremented by one with respect to the history ID of the underlying GOP is given to the history ID. As a result, identification codes of "5A, 5B, 5C, 4D, 4A, 4B" are given to the newly inserted video data.

Also, when performing such editing, the updating of the system ancillary data is also carried out. An explanation will be made of this updating by referring to FIGS. 16A to 16D.

When the data as shown in FIG. 16B is inserted in the video data as shown in FIG. 16A, as shown in FIG. 16C, the newly recorded data are recorded deviated in the forward direction (IN point direction) with respect to the underlying data or the newly-recorded data are recorded deviated in the backward direction (OUT point direction) with respect to the underlying data as shown in FIG. 16D. In any case, however, with respect to these data, the same ID as the underlying ID is given as the GOPID, and the ID obtained by incrementing the history ID of the GOP by one is given as the history ID. Namely, in the example of FIGS. 16C and 16D, identification codes of "4A, 4B, 4C" are given.

Then, the identification codes of these GOPs are recorded also in the system ancillary data of the GOP adjoining these GOPS. Accordingly, it is necessary to change also this data. Namely, the system ancillary data of the GOP having identification code "3D" positioned before the IN point are "3C, 3D, 3A", but the identification code of the next GOP changes by editing, so also the system ancillary data of this GOP is changed to "3C, 3D, 4A".

Also, the system ancillary data of the GOP having identification code "3D" positioned behind the OUT point are "3C, 3D, 3A", but tie identification code of the previous GOP changes by editing, so also the system ancillary data of this GOP is changed to "4C, 3D, 3A".

In this way, in the video data processing apparatus of the third embodiment, as the identification code, a code comprised by the GOPID and history ID is recorded. When the editing processing is carried out, the history ID of the video data at that position is updated, whereby it is understood that the editing has been carried out with respect to the video data of that GOP. Also, at this time, also the identification code of the edited GOP recorded in the system ancillary data of the GOPs before and after this is simultaneously updated.

By this, the system ancillary data is constantly suitably held, and also high speed processing, reverse reproduction processing, etc. as explained as in the second embodiment can be suitably carried out.

Further, it is clear from that identification code that the video data which is left without being erased, occurring at the editing, is unnecessary data, so erroneous reproduction can be prevented and also selective erasing can be easily carried out.

In the present embodiments, there was adopted a configuration wherein the identification code of the GOP which is to be reproduced next and the identification code of the GOP immediately before the GOP which is reproduced at present in time are recorded in the system ancillary data for every GOP together with the identification code of that GOP, but for example where reverse reproduction is not carried out, it is also possible not to record the identification code of the GOP immediately before the GOP in time.

Also, in the present embodiment, the identification code was added for every GOP and further for every type of the data, but in the present invention, it is sufficient so far as at least a code by which the GOP can be identified is given. It is not necessary to give a code for every type of the data.

Further, in the video data recording and reproducing apparatus of the present invention, the system ancillary data in which the identification codes of the video data for every GOP are recorded are used for suitably performing the reproduction for every GOP. For this reason, if different system ancillary data exist on the recording track of one GOP due to the track deviation when performing the editing, etc., there sometimes arises a case where various processings covered by the present invention can not be suitably carried out. Namely, desirably the system ancillary data recorded overlappingly in the recording tracks for every GOP are all in common. For this purpose, at the boundary portions of the GOPs on the tape, it is also possible not to record the number of tracks' worth of system ancillary data which may cause the track deviation and instead to record a special code such as "FFh", where h means a hexadecimal notation. When assuming that the number of tracks which may cause the track deviation is two tracks, the format on the tape is one where the system ancillary data are recorded in a short fashion by two tracks each in the forward and backward directions as shown in FIG. 4.

According to the present embodiment, there is provided a video data recording apparatus which records the video data encoded for every GOP on the recording medium to enable reproduction at a high speed or in the reverse direction by nontracking reproduction and a method thereof.

Also, there is provided a video data recording medium on which the video data encoded for every GOP can be recorded to enable reproduction at a high speed or in a reverse direction by nontracking reproduction.

Further, there is provided a video data reproducing apparatus which performs nontracking reproduction from such a recording medium enabling reproduction at a high speed or in the reverse direction and a method thereof.

More over, there is provided a video data editing apparatus which can suitably edit the video data recorded on such a recording medium and a method thereof.

Modification of Third Embodiment

Figure 17:
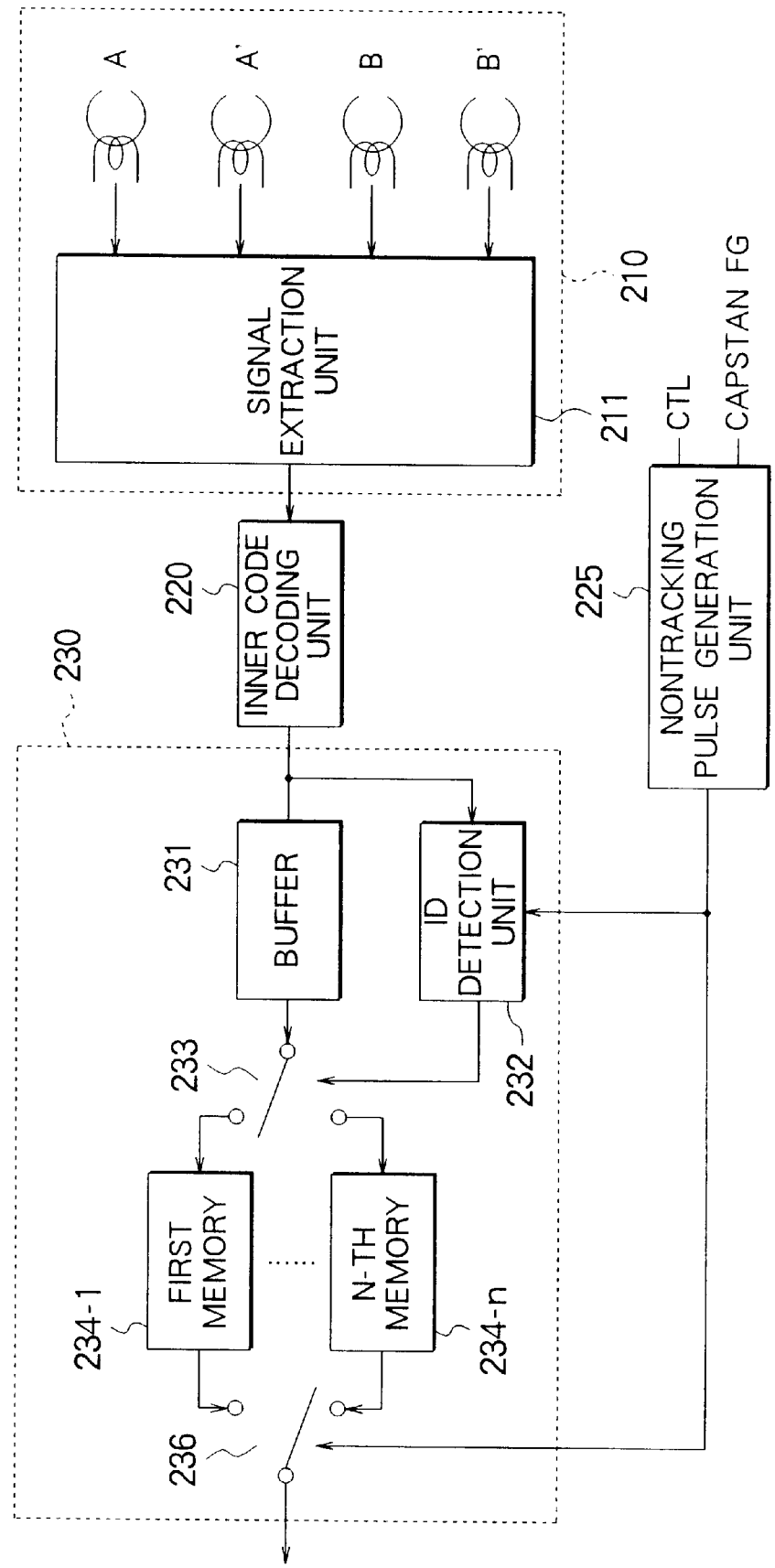
FIG. 17 is a block diagram of a reproduction unit and a nontracking control unit of the video data recording and reproduction apparatus shown in FIG. 11, as another example.

FIG. 17 is a view showing a modification of the third embodiment. In FIG. 17, the nontracking control unit 230 identical to that of FIG. 6 as the first embodiment is provided and the nontracking pulse generation unit 225 shown in FIG. 13 as the second embodiment is also provided. Namely, the configuration of FIG. 17 is a combination of the configuration of FIG. 6 and the configuration of FIG. 13.

The nontracking control unit 230 has the buffer 231, the ID detection unit 232, the input changeover switch 233, the first to n-th memories 234-1 to 234-n, and an output changeover switch 236, as shown in FIG. 17.

The buffer 231 is a storage means which temporarily stores the data block of the video data and the data block of the audio data from among the reproduction data blocks input from the inner code decoding unit 220.

The ID detection unit 232 detects the codes identifying the GOPs from the reproduction data blocks input from the inner code decoding unit 220, controls the input changeover switch 233 based on the result of detection, and appropriately records the reproduction data blocks temporarily stored in the buffer 231 in the first to n-th memories 234-1 to 234-n.

Specifically, the ID detection unit 232 operates as follows in according with the value of the nontracking pulse input from the nontracking pulse generation unit 225.

First, when the nontracking pulse is 1, that is, when data of a plurality of GOPs may be reproduced, the ID detection unit 232 detects the ID from the reproduced data blocks and controls the input changeover switch 233 so that the reproduced data blocks with the same ID are recorded in the same memory 234-i (i=1 to n).

Next, when the nontracking pulse is 0, that is, when the state is one in which data of a specific GOP is being reproduced, the ID detection unit 22 detects the data for the nontracking control recorded in the system ancillary data and extracts it as the reference ID. Then, it selects the data blocks having the same ID as the reference ID from the buffer 231 and continues to input them into the memory 234-i (i=1 to n) where the data blocks of that ID up to then had been input.

At this time, the data blocks having an ID which is not common with this reference ID are not recorded in any memory 234 and are erased in the buffer 231. The data which are detected as the reference ID the previous time and which have been recorded in the memory 234-i (i=1 n) heretofore are output from the nontracking control unit 230 to the outer code decoding unit 240 at this point of time. Also, the data of the memory 234 in which data blocks having an ID other than the reference ID have been recorded are erased. Accordingly, at the point of time when the nontracking pulse becomes 0, the data having the reference ID of the previous time are output to the outer code decoding unit 240. Only the data having the new reference ID are left and subsequently recorded.

Then, when the scanning on the video cassette tape 80 is further advanced and the nontracking pulse becomes 1 once again, the ID detection unit 232 detects the ID from the reproduced data blocks once again and controls the input changeover switch 233 again so that the reproduced data blocks having that common ID are recorded in a common memory 234-i (i=1 to n). At this time, in either memory 234-i (i=1 to n) of the first to n-th memories 234-1 to 234-n, the data blocks of the reference ID heretofore are recorded, so the data blocks having that ID are subsequently recorded in this memory 234-i (i=1 to n).

Such a processing is repeated by the ID detection unit 232, whereby the data blocks having a suitable ID of GOP can be sequentially selected from the buffer 231.

The input changeover switch 233 is a selecting means for storing the data blocks temporarily stored in the buffer 231 in the first to n-th memories 234-1 to 234-n and operates based on the control signal input from the ID detection unit 232.

The first to n-th memories 234-1 to 234-n are memories for recording the reproduction signal input from the buffer 231 via the input changeover switch 233. Basically, the data blocks having a common identification code in the reproduced data blocks are recorded in one memory.

The output changeover switch 236 is a selection circuit which selects the output data from the nontracking control unit 230, selects either memory of the first to n-th memories 234-1 to 234-n, and enables the reading from the outer code decoding unit 240. The output of the data to the outer code decoding unit 240 at this time is controlled by the nontracking pulse input from the nontracking pulse generation unit 225.

The outer code decoding unit 240 reads the data recorded in the memory of the nontracking control unit 230, performs the error correction based on the outer parity for every type of signal for every GOP, and sequentially stores the data as a result of this in the memory unit 250. The memory unit 250 is a memory storing the data for every GOP which is reproduced by the video cassette tape 80 and subjected to the error correction by the inner parity and outer parity. The data depack portion 260 recovers the encoded data train for every macro block of each GOP as shown in FIG. 2B from the data of each data block stored in the memory unit 250, outputs the video data to the decoding unit 270, and outputs the audio data from the audio output terminal Aout. The decoding unit 270 decodes and decompresses the compressed and encoded video data input from the data pack portion 260 and outputs the result as the ordinary video signal from the video output terminal Vout.

According to video data reproducing apparatus of the present embodiment, it is possible to simply detect the boundary portion for each GOP, that is, the region where data of a plurality of GOPs may be reproduced, when performing nontracking reproduction from a recording medium on which video data encoded for each GOP are recorded. Accordingly, it is possible to provide a video data reproducing apparatus which can suitably reproduce video data efficiently by a simple configuration.

Note that, the present invention is not limited to the above embodiments. Various modifications are possible.

What is claimed is:

1. Video data recording apparatus for recording video data on a slanted track on a magnetic tape, comprising:

compressing and encoding means for compressing and encoding a video signal in units of groups of pictures (GOPs) including a video data of a predetermined plurality of frames;

data arranging means for generating a signal upon detecting a boundary of each GOP and for dividing said video data compressed and encoded by said compressing and encoding means into a plurality of data blocks of a predetermined format;

generating means for generating a number of GOP identifying codes for identifying respective GOPs of said video data compressed and encoded by said compressing and encoding means, each GOP identifying code being generated in response to the generated signal supplied by said data arranging means;

adding means for adding a respective GOP identifying code generated by said generating means to each of said data blocks such that a first GOP identifying code corresponds to each of said data blocks forming a first GOP and a second GOP identifying code corresponds to each of said data blocks forming a second GOP; and recording means for recording on a predetermined number of slanted tracks on said magnetic tape said plurality of data blocks to each of which the respective GOP identifying code has been added by said adding means.

2. The video data recording apparatus as set forth in claim 1, further comprising an ancillary data block generating means for generating a predetermined number of ancillary data blocks including the GOP identifying codes generated by said generating means, the predetermined number of ancillary data blocks being recorded on said slanted tracks of said magnetic tape by said recording means.

3. The video data recording apparatus as set forth in claim 2, wherein said recording means records said ancillary data blocks overlappingly at a plurality of regions separated from each other in said slanted tracks of said magnetic tape.

4. The video data recording apparatus as set forth in claim 2, wherein said recording means records said predetermined number of ancillary data blocks on said slanted tracks of said magnetic tape other than a predetermined number of said slanted tracks near the boundaries of the GOPs on said tape.

5. The video data recording apparatus as set forth in claim 1, wherein the GOP identifying codes have history information updated in accordance with editing and recording operations.

6. The video data recording apparatus as set forth in claim 3, wherein said ancillary data block generating means generates said ancillary data blocks including history information updated in accordance with editing and recording operations.

7. The video data recording apparatus as set forth in claim 1, further comprising:

audio data arranging means for dividing audio data into a plurality of audio data blocks of a predetermined format; and second adding means for adding the respective GOP identifying code to each of said plurality of audio data blocks generated by said audio data arranging means, said recording means recording said audio data blocks to which said GOP identifying codes have been added by said second adding means on said predetermined number of slanted tracks on said magnetic tape.

8. A method of recording video data for recording video data on slanted tracks on a magnetic tape, comprising the steps of:

compressing and encoding a video signal in units of groups of pictures (GOPs) including video data of a predetermined plurality of frames;

generating a signal upon detecting a boundary of each GOP;

dividing the compressed and encoded video data into a plurality of data blocks of a predetermined format;

generating a number of GOP identifying codes for identifying respective GOPs of compressed and encoded video data, each GOP identifying code being generated in response to the generated signal;

adding a respective GOP identifying code to each of said data blocks such that a first GOP identifying code corresponds to each of said data blocks forming a first GOP and a second GOP identifying code corresponds to each of said data blocks forming a second GOP; and recording on a predetermined number of slanted tracks on said magnetic tape said plurality of data blocks to each of which the respective GOP identifying code has been added.

9. A video data reproduction apparatus for reproducing video data from a magnetic tape on which video data which has been compressed and encoded in units of groups of pictures (GOPs) including a predetermined number of a plurality of frames of video data has been divided into a plurality of data blocks of a predetermined format, added at each data block with a GOP identifying code for identifying respective GOPs of the compressed and encoded data such that a first GOP identifying code corresponds to each of said data blocks forming a first GOP and a second GOP identifying code corresponds to each of said data blocks forming a second GOP, and recorded on a predetermined number of slanted tracks on said magnetic tape, said video data reproduction apparatus comprising:

reproducing means for scanning said slanted tracks of said magnetic tape and reproducing said data blocks from said slanted tracks;

detecting means for detecting said GOP identifying codes which have been generated in response to a signal indicating a boundary of each GOP and which have been added to said data blocks reproduced by said reproducing means;

classifying means for classifying said data blocks reproduced by said reproducing means based on said GOP identifying codes detected by said detecting means; and selecting means for outputting said data blocks classified by said classifying means as reproduced video data in units of said GOPs.

10. The video data reproduction apparatus as set forth in claim 9, further comprising judging means for judging a GOP identifying code most often detected in a predetermined period among said GOP identifying codes detected by said detecting means as a reference GOP identifying code, and wherein said selecting means outputs said data blocks to which the same GOP identifying codes as said reference GOP identifying code are added in units of said GOPs as said reproduced video data based on said judging means.

11. A video data reproduction apparatus for reproducing video data from a magnetic tape on which video data which has been compressed and encoded in units of groups of pictures (GOPs) including a predetermined number of a plurality of frames of video data has been divided into a plurality of data blocks of a predetermined format, added at each data block with a GOP identifying code for identifying respective GOPs of the compressed and encoded data such that a first GOP identifying code corresponds to each of said data blocks forming a first GOP and a second GOP identifying code corresponds to each of said data blocks forming a second GOP, and recorded on slanted tracks on the magnetic tape and on which a predetermined number of ancillary data blocks holding said GOP identifying code as a reference GOP identifying code is recorded on slanted tracks of said magnetic tape other than the predetermined number of slanted tracks near boundaries of the GOPs on the magnetic tape, said video data reproduction apparatus comprising:

reproducing means for scanning the slanted tracks of said magnetic tape and reproducing said data blocks and ancillary data blocks from said slanted tracks;

detecting means for selectively detecting said GOP identifying codes which have been generated in response to a signal indicating a boundary of each GOP and which have been added to said data blocks reproduced by said reproducing means or detecting said reference GOP identifying code from said ancillary data blocks;

classifying means for classifying said data blocks reproduced by said reproducing means based on said GOP identifying codes detected by said detecting means; and selecting means for outputting as reproduced video data in units of GOPs said data blocks to which the same GOP identifying codes as said reference GOP identifying code have been added based on said detecting means.

12. A video data reproduction method for reproducing video data from a magnetic tape on which video data which has been compressed and encoded in units of groups of pictures (GOPs) including a predetermined number of a plurality of frames of video data has been divided into a plurality of data blocks of a predetermined format, added at each data block with a GOP identifying code for identifying respective GOPs of the compressed and encoded data such that a first GOP identifying code corresponds to each of said data blocks forming a first GOP and a second GOP identifying code corresponds to each of said data blocks forming a second GOP, and recorded on a predetermined number of slanted tracks on the magnetic tape, comprising the steps of:

scanning the slanted tracks on said magnetic tape and reproducing said data blocks from said slanted tracks;

detecting said GOP identifying codes which have been generated in response to a signal indicating a boundary of each GOP and which have been added to said reproduced data blocks;

classifying said reproduced data blocks based on said detected GOP identifying codes; and outputting said classified data blocks as reproduced video data in units of said GOPs.

13. The video data reproduction method as set forth in claim 1, further comprising the steps of:

judging a GOP identifying code most often detected in a predetermined period among said GOP identifying codes detected by said detecting means as a reference GOP identifying code; and outputting said data blocks to which the same GOP identifying codes as said reference GOP identifying code are added in units of said GOPs as said reproduced video data based on the judgement.

14. A video data reproduction method for reproducing video data from a magnetic tape on which video data which has been compressed and encoded in units of groups of pictures (GOPs) including a predetermined number of a plurality of frames of video data has been divided into a plurality of data blocks of a predetermined format, added at each data block with a GOP identifying code for identifying respective GOPs of the compressed and encoded data such that a first GOP identifying code corresponds to each of said data blocks forming a first GOP and a second GOP identifying code corresponds to each of said data blocks forming a second GOP, and recorded on slanted tracks on the magnetic tape and on which a predetermined number of ancillary data blocks holding said GOP identifying code as a reference GOP identifying code information is recorded on slanted tracks of the magnetic tape other than the predetermined number of slanted tracks near boundaries of the GOPs on the magnetic tape, comprising the steps of:

scanning the slanted tracks of said tape and reproducing said data blocks and ancillary data blocks from said slanted tracks;

selectively detecting said GOP identifying codes which have been generated in response to a signal indicating a boundary of each GOP and which have been added to said reproduced data blocks or detecting said reference GOP identifying code from said ancillary data blocks;

classifying said reproduced data blocks based on the detected GOP identifying codes; and outputting as reproduced video data in units of GOPs said data blocks to which the same GOP identifying codes as said reference GOP identifying code have been added based on the detection.

15. A video data reproduction apparatus for reproducing video data from a magnetic tape on which video data which has been compressed and encoded in units of groups of pictures (GOPs) including a predetermined number of a plurality of frames of video data has been divided into a plurality of data blocks of a predetermined format, added at each data block with a GOP identifying code for identifying respective GOPs of the compressed and encoded data such that a first GOP identifying code corresponds to each of said data blocks forming a first GOP and a second GOP identifying code corresponds to each of said data blocks forming a second GOP, and recorded on slanted tracks on the magnetic tape and on which a predetermined number of ancillary data blocks holding said GOP identifying code and a next GOP identifying code information for identifying a next GOP continuing from said GOP as a reference GOP identifying code and next reference GOP identifying code, respectively, are recorded on slanted tracks of the magnetic tape other than the predetermined number of slanted tracks near boundaries of the GOPs on the tape, said video data reproduction apparatus comprising:

reproducing means for scanning the slanted tracks of said magnetic tape and reproducing said data blocks and ancillary data blocks from said slanted tracks;

detecting means for selectively detecting said GOP identifying codes which have been generated in response to a signal indicating a boundary of each GOP and which have been added to said data blocks reproduced by said reproducing means or detecting said reference GOP identifying code and next reference GOP identifying code from said ancillary data blocks;

classifying means for classifying said data blocks reproduced by said reproducing means based on said GOP identifying codes, said reference GOP identifying code, and said next reference GOP identifying code detected by said detecting means; and selecting means for outputting as reproduced video data in units of GOPs said data blocks to which the same GOP identifying codes as said reference GOP identifying code classified by said classifying means have been added.

16. A video data reproduction apparatus for reproducing video data from a magnetic tape on which video data which has been compressed and encoded in units of groups of pictures (GOPs) including a predetermined number of a plurality of frames of video data has been divided into a plurality of data blocks of a predetermined format, added at each data block with a GOP identifying code for identifying respective GOPs of the compressed and encoded data such that a first GOP identifying code corresponds to each of said data blocks forming a first GOP and a second GOP identifying code corresponds to each of said data blocks forming a second GOP, and recorded on slanted tracks on the magnetic tape and on which a predetermined number of ancillary data blocks holding said GOP identifying code as a reference GOP identifying code information is recorded on slanted tracks of the magnetic tape other than the predetermined number of slanted tracks near boundaries of the GOPs on the tape or on which control signals are recorded in correlation with positions of the slanted tracks, said video data reproduction apparatus comprising:

reproducing means for scanning the slanted tracks of said magnetic tape and reproducing said data blocks and ancillary data blocks from said slanted tracks;

detecting means for selectively detecting said GOP identifying codes which have been generated in response to a signal indicating a boundary of each GOP and which have been added to said data blocks reproduced by said reproducing means or detecting said reference GOP identifying code information from said ancillary data blocks;

signal generating means for generating a signal showing the positions of the predetermined number of tracks near boundaries of the GOPs on said magnetic tape from said control signals reproduced from said magnetic tape and another signal showing speed of said magnetic tape;

classifying means for classifying said reproduced data blocks based on said GOP identifying codes, said reference GOP identifying codes detected by said detecting means when said data blocks are reproduced from a predetermined number of slanted tracks near the boundaries of the GOPs and for classifying the reproduced data blocks based on said reference GOP identifying code detected by said detecting means when said data blocks are reproduced from slanted tracks other than said predetermined number of slanted tracks near the boundaries of the GOPs based on said signal generated by said signal generating means; and selecting means for outputting as reproduced video data in units of GOPs said data blocks to which the same GOP identifying codes as said reference GOP identifying code have been added.

17. A video data recording and reproducing apparatus for recording video data on a slanted track on a magnetic tape and for reproducing said video data from said magnetic tape, comprising:

compressing and encoding means for compressing and encoding said video signal in units of groups of pictures (GOPs) including the video data of a predetermined plurality of frames, data arranging means for generating a signal upon detecting a boundary of each GOP and for dividing the video data compressed and encoded by said compressing and encoding means into a plurality of data blocks of a predetermined format;

generating means for generating a number of GOP identifying codes for identifying respective GOPs of the video data compressed and encoded by said compressing and encoding means, each GOP identifying code being generated in response to the generated signal supplied by said data arranging means;

adding means for adding a respective GOP identifying code generated by said generating means to each of said data blocks such that a first GOP identifying code corresponds to each of said data blocks forming a first GOP and a second GOP identifying code corresponds to each of said data blocks forming a second GOP;

recording means for recording on a predetermined number of slanted tracks on said magnetic tape said plurality of data blocks to each of which the respective GOP identifying code has been added by said adding means;

reproducing means for scanning the slanted tracks of said magnetic tape and reproducing said data blocks from said slanted tracks;

detecting means for detecting said GOP identifying codes which have been added to said data blocks reproduced by said reproducing means;

classifying means for classifying said data blocks reproduced by said reproducing means based on said GOP identifying codes detected by said detected means; and selecting means for outputting said data blocks classified by said classifying means as reproduced video data in units of said GOPs.

18. A method for recording video data on slanted tracks on a magnetic tape and reproducing said video data from said magnetic tape, comprising the steps of:

compressing and encoding a video signal in units of groups of pictures (GOPs) including the video data of a predetermined plurality of frames;

generating a signal upon detecting a boundary of each GOP;

dividing the compressed and encoded video data into a plurality of data blocks of a predetermined format;

generating a number of GOP identifying codes for identifying respective GOPs of the compressed and encoded video data, each GOP identifying code being generated in response to the generated signal;

adding a respective GOP identifying code to each of said data blocks such that a first GOP identifying code corresponds to each of said data blocks forming a first GOP and a second GOP identifying code corresponds to each of said data blocks forming a second GOP;

recording on a predetermined number of slanted tracks on the tape said plurality of data blocks to each of which the respective GOP identifying code has been added;

scanning the slanted tracks of said tape and reproducing said data blocks from said slanted tracks;

detecting said GOP identifying codes which have been added to said reproduced data blocks;

classifying said reproduced data blocks based on said detected GOP identifying codes; and outputting said classified data blocks as reproduced video data in units of said GOPs.

\* \* \* \* \*